United States Patent
Kotaka et al.

(10) Patent No.: US 9,527,695 B2
(45) Date of Patent: Dec. 27, 2016

(54) RECORDING APPARATUS HAVING ACCESS PATH TO RECORDING UNIT

(71) Applicant: SEIKO EPSON CORPORATION, Tokyo (JP)

(72) Inventors: Toshikazu Kotaka, Shiojiri (JP); Toru Tanjo, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/946,342

(22) Filed: Nov. 19, 2015

(65) Prior Publication Data

US 2016/0144636 A1 May 26, 2016

(30) Foreign Application Priority Data

Nov. 25, 2014 (JP) ................................. 2014-238088
Dec. 8, 2014 (JP) ................................. 2014-248117
Aug. 24, 2015 (JP) ................................. 2015-164506

(51) Int. Cl.
*B65H 85/00* (2006.01)
*B41J 2/165* (2006.01)
*G03G 21/16* (2006.01)
*B65H 31/02* (2006.01)
*G03G 15/00* (2006.01)

(52) U.S. Cl.
CPC .......... *B65H 85/00* (2013.01); *B41J 2/16508* (2013.01); *B41J 2/16511* (2013.01); *B41J 2/16585* (2013.01); *B65H 31/02* (2013.01); *G03G 15/6552* (2013.01); *G03G 21/1609* (2013.01); *G03G 21/1695* (2013.01); *B65H 2301/4212* (2013.01); *B65H 2402/45* (2013.01); *B65H 2405/1117* (2013.01); *B65H 2601/324* (2013.01); *B65H 2801/06* (2013.01)

(58) Field of Classification Search
None
See application file for complete search history.

(56) References Cited

U.S. PATENT DOCUMENTS

| | | | |
|---|---|---|---|
| 2006/0044336 A1* | 3/2006 | Asanuma ................. | B41J 29/38 347/14 |
| 2006/0187291 A1* | 8/2006 | Asanuma ............... | B41J 2/1752 347/104 |
| 2008/0012920 A1* | 1/2008 | Matsuda ................. | B41J 11/20 347/104 |

(Continued)

FOREIGN PATENT DOCUMENTS

| | | |
|---|---|---|
| JP | 2010-228434 A | 10/2010 |
| JP | 2013-136242 A | 7/2013 |

*Primary Examiner* — Bradley Thies
(74) *Attorney, Agent, or Firm* — Workman Nydegger

(57) ABSTRACT

A recording apparatus includes a recording unit which performs recording on a sheet which is transported along a transport path, a printer unit which accommodates the recording unit, a medium discharging port from which the sheet on which recording is performed by the recording unit is discharged, and a placing table which is located at a higher part of the recording unit, receives and supports the sheet which is discharged by the medium discharging port, and is provided in an openable-closable manner with respect to the printer unit. In addition, an access path through which it is possible to access the recording unit from the higher part by causing the placing table to be opened is formed.

13 Claims, 25 Drawing Sheets

(56) References Cited

U.S. PATENT DOCUMENTS

2013/0135406 A1\* 5/2013 Yamamoto ............... B41J 11/00
 347/101
2015/0084488 A1\* 3/2015 Vellutato, Jr. .......... A47B 81/00
 312/34.4

\* cited by examiner

RECORDING APPARATUS HAVING ACCESS PATH TO RECORDING UNIT

BACKGROUND

1. Technical Field

The present invention relates to a recording apparatus.

2. Related Art

In the related art, as a type of a recording apparatus, an ink jet printer which performs printing (recording) by ejecting ink onto a medium such as a sheet from a line head (recording unit) has been known (for example, refer to JP-A-2013-136242). Such a printer includes an apparatus housing in which a higher housing which has a sheet discharging unit on a top face is rotatably configured with respect to a lower housing around a shaft line which is extended in the horizontal direction.

That is, the higher housing is rotatably configured between a position which is close to the lower housing and a position which is separated from the lower housing. In addition, since the higher housing is mounted with a line head in the printer, it is possible to perform maintenance of the head by accessing the head of the higher housing from an opening on the front face side which is formed when the higher housing is rotated at the position which is separated from the lower housing.

In addition, in such a printer, there is a case in which an image is not correctly printed on a sheet due to a recording unit which is inclined to a width direction which is orthogonal to a transport direction of the sheet, and the quality of the printed image deteriorates.

In particular, in a printer which can eject ink over a width direction which is orthogonal to a transport direction of a sheet at the same time, there is a case in which, as a recording unit, a configuration including a plurality of liquid ejecting heads in which nozzle columns which are formed of a plurality of nozzles are arranged along the width direction of the sheet is adopted. In this case, the recording unit is configured so that nozzles are continued at regular intervals in the width direction of the sheet, when each nozzle column of the liquid ejecting head is arranged in a so-called zigzag shape which is offset in the transport direction of the sheet.

In a case of a recording unit which includes a liquid ejecting head which has such a plurality of nozzle columns, the distance between adjacent nozzle columns in a width direction of a sheet is changed when viewed from the transport direction of the sheet, when the recording unit is inclined to the width direction of the sheet in a plane direction of a recording face. For this reason, a gap between nozzles in the width direction of the sheet becomes a gap which is different between nozzle columns. As a result, the quality of an image which is printed using ink ejected from nozzles which are not at regular intervals in the width direction deteriorates.

For this reason, it is necessary to adjust the inclination of a recording unit to the width direction of a sheet which is transported, that is, the inclination of a liquid ejecting head. In addition, as a method of adjusting the inclination of the liquid ejecting head, as in FIG. 25, in the related art, a configuration in which liquid ejecting heads 1201 to 1210 are included, and a head base body 1002 (recording unit) which is pulled using an urging member (pulling coil spring 1232) is rotated around a reference pin 1002P against an urging force of the urging member while being in contact with a cam 1027 (eccentric cam) has been proposed. That is, a method of rotating the head base body by a degree of offsetting a position deviation of the head base body 1002 (recording unit) while positioning the head base body 1002 (recording unit) by causing the cam 1027 and an outer edge of the head base body 1002 (recording unit) to come into contact with each other using the urging member has been proposed (for example, refer to JP-A-2010-228434).

However, as the related art (FIG. 25), when adopting a configuration in which the cam 1027 rotates while pressing the head base body 1002 (recording unit) against an urging force of the urging member, and while being in contact with the outer edge of the head base body 1002 (recording unit) which includes the plurality of liquid ejecting heads 1201 to 1210, it is necessary to secure a space for arranging at least a portion of the cam 1027. For this reason, there is a concern that the head base body 1002 (recording unit) may become large.

In addition, abrasion of at least one of the cam and the outer edge of the liquid ejecting head due to a rotation of the cam is accelerated because of the urging force of the urging member. For this reason, there also is a concern that it may not be possible to rotate the liquid ejecting head by a degree of offsetting a position deviation using a rotation of the cam.

In addition, when adopting a configuration in which the liquid ejecting head is positioned by being urged using the urging member, for example, the urging member which urges the liquid ejecting head vibrates due to vibration which occurs when a sheet is transported at high speed, or the like, and the liquid ejecting head may vibrate in a rotation direction. As a result, there also is a concern that the recording quality may deteriorate due to the vibration of the liquid ejecting head.

In addition, in the above described printer, the head is attached to the higher housing. That is, the head is provided to the higher housing which is different from the lower housing to which a medium in which printing is performed by the head is transported. For this reason, it is necessary to secure the accuracy of a hinge of the higher housing with respect to the lower housing so as to secure printing accuracy; however, since it is difficult to secure the accuracy of the hinge, there is a problem in that it is not possible to secure the positional accuracy of the head in some cases.

SUMMARY

An advantage of some aspects of the invention is to provide a recording apparatus in which it is possible to easily perform maintenance work of a recording unit while securing the positional accuracy of the recording unit, and a recording apparatus in which it is possible to suppress an increase in the size of the apparatus by saving a space for arranging a mechanism for performing an inclination correction of the recording unit.

Hereinafter, means of the invention and operational effects thereof will be described.

According to an aspect of the invention, there is provided a recording apparatus which includes a recording unit which performs recording on a medium which is transported along a transport path; an accommodating unit which accommodates the recording unit; a discharging unit which discharges the medium on which recording is performed by the recording unit; and a support unit which is located at a higher part of the recording unit, receives and supports the medium which is discharged by the discharging unit, and is openable or closable with respect to the accommodating unit, in which an access path through which it is possible to access the recording unit from the higher part by causing the support unit to be opened is formed.

According to the configuration, the access path through which it is possible to access the recording unit from the higher part is formed by causing the support unit to be opened. In addition, the recording unit does not move even when the support unit is opened. Accordingly, it is possible to easily perform maintenance work of the recording unit while securing the positional accuracy of the recording unit.

In the recording apparatus, it is preferable to configure so that a portion of the support unit which overlaps the recording unit when viewed from the above can be opened until the portion becomes smaller than that in a closed state.

According to the configuration, it is possible to easily access the recording unit from the higher part.

According to another aspect of the invention, there is provided a recording apparatus which includes a recording unit which performs recording on a medium which is transported along a transport path; an accommodating unit which accommodates the recording unit; a discharging unit which discharges the medium on which recording is performed by the recording unit; a support unit which is located at a higher part of the recording unit, receives and supports the medium which is discharged by the discharging unit, and is openable or closable with respect to the accommodating unit; and a path forming member which is arranged between the support unit and the recording unit, and forms a reverse path on which the medium is reversed, in which an access path through which it is possible to access the recording unit from the higher part is formed by causing the path forming member to be opened in a state in which the support unit is opened.

According to the configuration, the access path through which it is possible to access the recording unit from the higher part is formed by causing the path forming member to be opened in a state in which the support unit is opened. In addition, the recording unit does not move even when the support unit and the path forming member are opened. Accordingly, it is possible to easily perform maintenance work of the recording unit while securing the positional accuracy of the recording unit.

In the recording apparatus, it is preferable that the path forming member is inclined so as to be high along a discharging direction in which the medium is discharged, and an opening-closing fulcrum when the path forming member is opened or closed is located on the upstream side in the discharging direction.

According to the configuration, it is possible to easily open the path forming member.

In the recording apparatus, it is preferable that the path forming member is detachably configured with respect to the accommodating unit.

According to the configuration, it is possible to further easily access the recording unit from the higher part by taking out the path forming member from the accommodating unit.

In the recording apparatus, it is preferable that the support unit is inclined so as to be high along the discharging direction in which the medium is discharged, and an opening-closing fulcrum when the support unit is opened or closed is located on the upstream side in the discharging direction.

According to the configuration, it is possible to easily open the support unit.

In the recording apparatus, it is preferable that the support unit is detachably configured with respect to the accommodating unit.

According to the configuration, it is possible to further easily access the recording unit from the higher part by taking out the support unit from the accommodating unit.

In the recording apparatus, it is preferable that, in the recording unit, a through hole of one end side which penetrates one end portion in a longitudinal direction in a direction which goes along a normal line, and a through hole of the other end side which penetrates the other end portion in the longitudinal direction in a direction which goes along the normal line are provided by setting a direction which intersects both of a transport direction of the medium in the transport path and a direction which goes along the normal line of a recording face of the medium to the longitudinal direction, in the accommodating unit, a base stand unit in which an insertion shaft of one end side which has a shaft line in a direction which goes along the normal line, and is inserted into the through hole of one end side, and an insertion shaft of the other end side which has a shaft line in a direction which goes along the normal line, and is inserted into the through hole of the other end side are provided, the through hole of one end side is a circular hole, the insertion shaft of one end side is a fixed shaft of one end side which is fixed to the base stand unit, and the through hole of the other end side is an elongated hole which has a parallel edge portion which goes along the longitudinal direction of the recording unit, and the insertion shaft of the other end side is a fixed shaft of the other end side which is fixed to the base stand unit.

According to the configuration, the recording unit is prevented from moving in the transport direction and longitudinal direction due to the insertion shaft of one end side and the insertion shaft of the other end side, and the recording unit is positioned.

In the recording apparatus, it is preferable that the insertion shaft of the other end side includes an eccentric cylindrical member which has a cylindrical face in which a shaft line which is eccentric from a center shaft line of the fixed shaft of the other end side is set to a center shaft on an outer face, and the cylindrical face can rotate around the fixed shaft of the other end side.

According to the configuration, by rotating the eccentric cylindrical member, an inclination of the recording unit in the longitudinal direction with respect to a direction intersecting the transport direction is adjusted.

In the recording apparatus, it is preferable that the recording unit is configured by including a plurality of liquid ejecting heads which are provided side by side in the longitudinal direction, and the through hole of the other end side is arranged so as to overlap a liquid ejecting head which is located at the end of the other end portion side in the plurality of liquid ejecting heads, in the transport direction of the medium of the recording unit.

According to the configuration, it is possible to form the through hole of the other end side for positioning the recording unit without making a shape of the recording unit large by extending an appearance of the recording unit in the longitudinal direction or the transverse direction. That is, it is possible to suppress increasing in size of the recording apparatus by performing space-saving of the external dimension of the recording unit.

In the recording apparatus, it is preferable that the through hole of one end side is arranged so as to overlap a liquid ejecting head which is located at the end of the one end portion side in the plurality of liquid ejecting heads, in the transport direction of the medium of the recording unit.

According to the configuration, it is possible to form the through hole of one end side for positioning the recording unit without making the shape of the recording unit large by extending the appearance of the recording unit in the longitudinal direction or transverse direction. That is, it is possible to suppress increasing in size of the recording apparatus by performing space-saving of the external dimension of the recording unit.

In the recording apparatus, it is preferable that a moving unit which relatively moves the recording unit with respect to the recording face of the medium is further included, and the insertion shaft of one end side and the insertion shaft of the other end side are guiding shafts which guide the movement of the recording unit, when the moving unit moves the recording unit.

According to the configuration, since it is not necessary to separately provide a guiding shaft when relatively moving the recording unit with respect to the recording face of the medium, it is possible to prevent a structure of the recording apparatus from becoming complicated.

In the recording apparatus, it is preferable that, when the through hole of one end side into which the insertion shaft of one end side is inserted is set to a first through hole, the recording unit includes a second through hole which is provided at a position far from the recording face of the medium compared to the first through hole in a movement direction in which the recording unit is moved by the moving unit, and into which the insertion shaft of one end side is inserted, and the second through hole is an elongated hole which has a parallel edge portion which goes along the longitudinal direction of the recording unit.

According to the configuration, when adjusting the recording unit so as to be parallel to the recording face of the medium, the insertion shaft of one end side can smoothly move without being scooped out in the second through hole which is an elongated hole, even when movement amounts of the recording unit in the movement direction are different in both end portions in the longitudinal direction.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, an embodiment of a recording apparatus will be described with reference to drawings.

Figure 1:
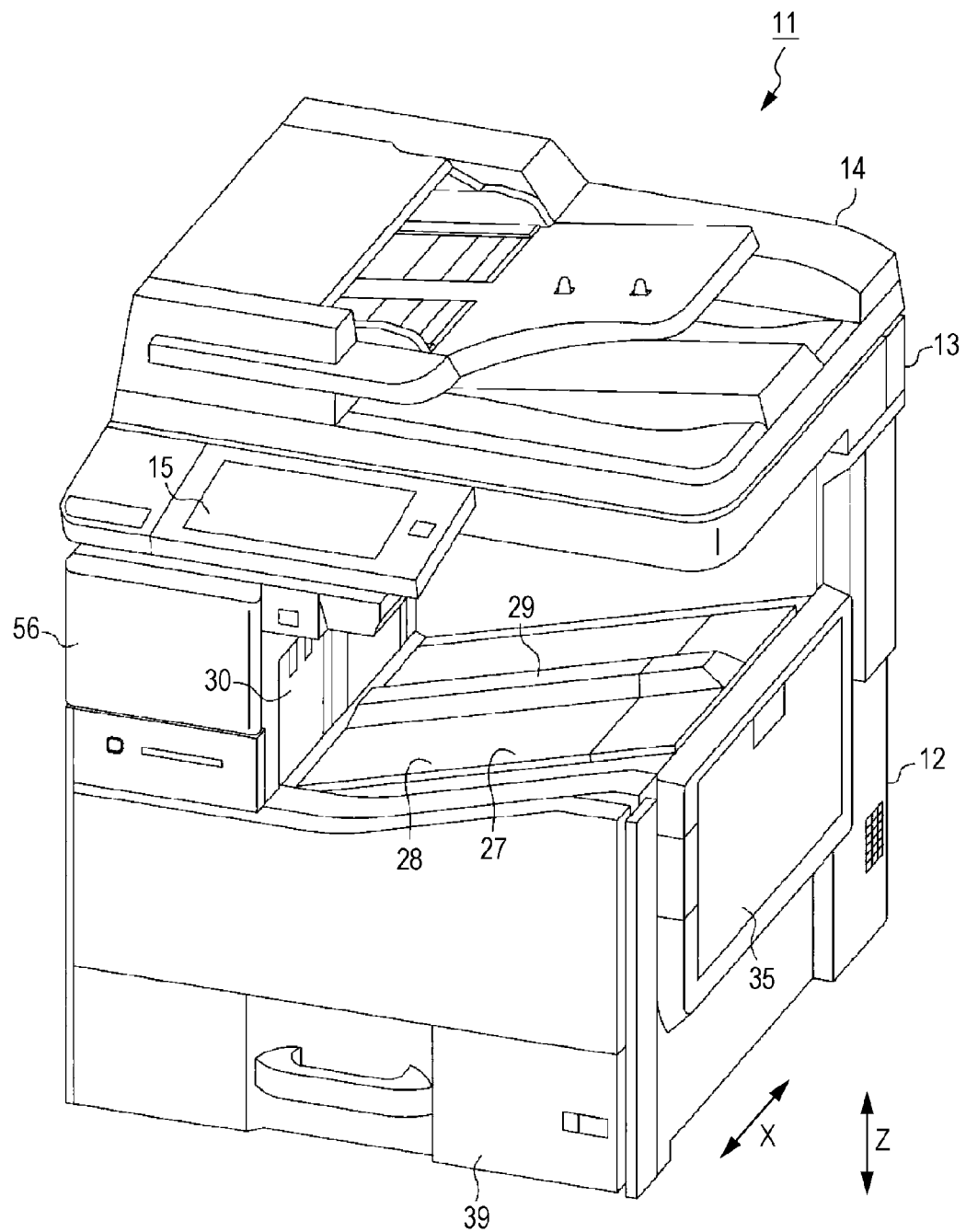
FIG. 1 is a perspective view of a recording apparatus.

As illustrated in FIG. 1, a recording apparatus 11 is formed in an approximately rectangular parallelepiped shape which is long in the vertical direction Z as a whole, and includes a printer unit 12 as an example of an accommodating unit, a scanner unit 13 which is arranged on the printer unit 12, and an automatic sheet feeder 14 which is arranged on the scanner unit 13. An operation unit 15 for performing various operations of the recording apparatus 11 is provided next to the scanner unit 13 on the printer unit 12.

Figure 2:
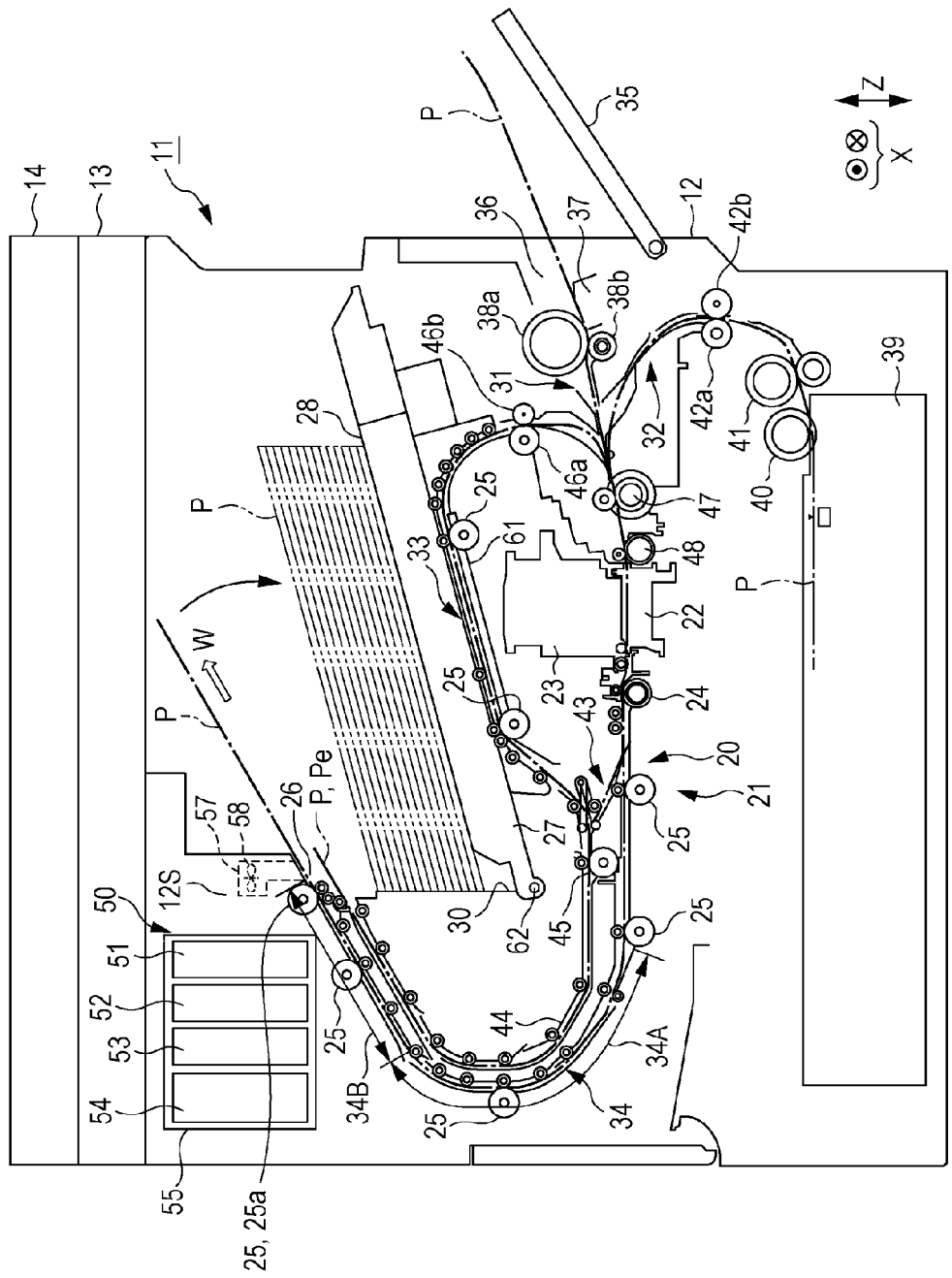
FIG. 2 is a schematic structural diagram of the recording apparatus.

As illustrated in FIG. 2, a medium transport path 20 as an example of a transport path on which a sheet P as an example of a medium is transported, and a transport unit 21 which is configured of a plurality of rollers (pair of rollers), and transports the sheet P along the medium transport path 20 are provided in the printer unit 12. In addition, a supporting table 22 which supports the sheet P from the lower side in the vertical direction Z, and a line-type recording unit 23 which prints an image on the sheet P which is supported by the supporting table 22 are accommodated in the printer unit 12.

The printer unit 12 sets a direction which is orthogonal to a paper face in FIG. 2 to a width direction X of the sheet P, and transports the sheet P onto the supporting table 22, and along the medium transport path 20 by setting a direction which intersects the width direction X as a transport direction. The recording unit 23 includes a line head as a liquid ejecting head which can eject ink over the entire region in the width direction X which intersects the transport direction of the sheet P at the same time at the lower part, and prints an image by ejecting ink onto the sheet P which is transported on the supporting table 22 from the higher side in the vertical direction Z, and causing the ink to be attached to the sheet P.

The printed sheet P is transported to the medium transport path 20 from the recording unit 23 using a pair of sheet discharging rollers 24 or another plurality of pair of transport rollers 25, and is discharged from a medium discharging port 26 as an example of a discharging unit which is provided at an end portion of the medium transport path 20 on the downstream side. The sheet P which is discharged from the medium discharging port 26 falls down, and is placed on the placing table 27 as an example of the support unit which is arranged on the higher side of the recording unit 23 in the vertical direction Z in a stacked state as denoted by a two-dotted chain line in FIG. 2. That is, the placing table 27 sequentially receives the printed sheet P which falls down by being discharged from the medium discharging port 26, and supports the sheet P.

As illustrated in FIGS. 1 and 2, the placing table 27 is formed in an approximately rectangular plate shape, and is inclined so as to be high along the discharging direction W of the sheet P. A top face of the placing table 27 is set to an inclined placing face 28, and the sheet P is placed on the placing face 28. A convex portion 29 which is extended in the discharging direction W is formed at approximately the center of the sheet P in the width direction X on the placing face 28.

The sheet P which is placed on the placing face 28 slides down in a direction opposite to the discharging direction W along the inclination of the placing face 28, and is positioned when an end portion thereof on the side opposite to the discharging direction W side comes into contact with a vertical side wall 30 which is provided on the downstream side of the medium discharging port 26 in the printer unit 12, as denoted by the two-dotted chain line in FIG. 2. In addition, the discharging direction W of the sheet P is remarkably inclined to a level surface compared to the placing face 28.

As illustrated in FIG. 2, according to the embodiment, the medium transport path 20 includes a medium discharging path 34 which transports the sheet P from the recording unit 23 to the medium discharging port 26, and a medium supply path which supplies the sheet P to the recording unit 23, and the medium supply path is configured of a first medium supply path 31, a second medium supply path 32, and a third medium supply path 33 as an example of a reverse path.

The medium discharging path 34 includes a curved path 34A which is curved by having the recording face of the sheet P which is printed by the recording unit 23 in the inside, and a straight path 34B on which the sheet P is transported in one direction from the curved path 34A toward the medium discharging port 26, between a path on which the sheet P which is printed by the recording unit 23 is transported to the medium discharging port 26.

The medium discharging path 34 functions as a curved reverse path on which the sheet P is reversed so as to face the lower side from a state in which the recording face of the sheet P faces the higher side in the vertical direction, when the sheet P is transported on the curved path 34A and the straight path 34B. Accordingly, the sheet P enters a state in which the recording face thereof faces the placing face 28 of the placing table 27 by passing through the medium discharging path 34 which functions as the curved reverse path, and is discharged onto the placing table 27 which is located at the higher part of the recording unit 23 from the medium discharging port 26.

In the medium discharging path 34 which is included in the medium transport path 20, the transport direction of the sheet P which is transported on the straight path 34B is one direction which belongs to the straight path 34B, and according to the embodiment, the one direction is set to be an inclining direction in which the head is rising, which rises toward the medium discharging port 26. Accordingly, the direction of the straight path 34B (one direction) which is inclined becomes the discharging direction W of the sheet P which is discharged from the medium discharging port 26.

In the first medium supply path 31, the sheet P which is inserted from an insertion port 36 which is exposed when a cover 35 provided on one side face of the printer unit 12 is opened, is transported to the recording unit 23. That is, the sheet P which is inserted from the insertion port 36 is pressed to a first driving roller 38a using a hopper 37, is transported due to the rotational driving of the first driving roller 38a, is interposed between the first driving roller 38a and a first driven roller 38b, and is transported toward the recording unit 23 due to the rotational driving of the first driving roller 38a thereafter.

In the second medium supply path 32, the sheet P which is placed so as to be stacked in a sheet cassette 39 which is provided at a base portion of the printer unit 12 which is the lower side of the printer unit 12 in an inserting-extracting manner is transported to the recording unit 23. That is, in the sheets P which are placed in the sheet cassette 39 in a stacked state, the top sheet P is sent out using a pickup roller 40, is interposed between a second driving roller 42a and a second driven roller 42b after being separated into one sheet using a pair of separation rollers 41, and is transported toward the recording unit 23 due to the rotational driving of the second driving roller 42a.

In the third medium supply path 33, when double-sided printing in which printing is performed on both sheet faces (paper face) is performed on the sheet P, the sheet P of which a single sheet face is printed by the recording unit 23 is transported to the recording unit 23 again. That is, a branching transport path 44 which is branched from the medium discharging path 34 due to an operation of a branching mechanism 43 which is provided in the middle of the medium discharging path 34 is provided on the side further downstream than the recording unit 23 in the transport direction of the sheet P. A pair of branching transport path rollers 45 which can perform a bidirectional rotation of normal rotation and reversed rotation is provided on the downstream side of the branching mechanism 43 on the branching transport path 44.

In addition, the sheet P of which the single sheet face is printed is temporarily transported to the branching transport path 44 from the recording unit 23 side toward the placing table 27 side using the pair of branching transport path rollers 45 which is normally rotated, at a time of double-sided printing. At this time, when a part Pe of the sheet P on the tip end side in the transport direction, which is transported to the branching transport path 44 is projected from the medium discharging port 26, a projecting position thereof is set so as not to come into contact with the sheet P which is placed in the placing table 27 in a stacked state.

Thereafter, the sheet P which is transported to the branching transport path 44 is reversely transported from the placing table 27 side to the recording unit 23 side on the branching transport path 44 using the pair of branching transport path rollers 45 which is reversely rotated. At this time, the sheet P which is reversely transported is transported to the third medium supply path 33, and is transported toward the recording unit 23 using a plurality of pair of transport rollers 25. Due to transporting to the third medium supply path 33, the sheet P is reversed so that a sheet face which is not printed faces the recording unit 23, is interposed between a third driving roller 46a and a third driven roller 46b, and is transported toward the recording unit 23 due to the rotational driving of the third driving roller 46a.

The sheet P which is transported toward the recording unit 23 on each of the medium supply paths is transported to a pair of aligning rollers 47 which is arranged on the upstream side of the recording unit 23 in the transport direction, and a tip end thereof collides with the pair of aligning rollers 47 which stops rotating thereafter. In addition, a correction of an inclination of the sheet P (skew removing) in the transport direction is performed due to such a state of being collided with the pair of aligning rollers 47. In addition, the sheet P of which the inclination is corrected is transported to the recording unit 23 side by being in an aligned state due to the rotational driving of the pair of aligning rollers 47 thereafter.

The sheet P which is transported to the recording unit 23 side using the pair of aligning rollers 47 is transported while facing the recording unit 23 using a pair of sheet sending rollers 48 which is arranged on the upstream side of the sheet P in the transport direction, or a pair of sheet discharging rollers 24 and a pair of transport rollers 25 which are arranged on the downstream side in the transport direction with respect to the recording unit 23. Printing is performed on the sheet P which is transported by ejecting ink from the facing recording unit 23.

As illustrated in FIG. 2, a liquid storage unit 50 which stores ink to be supplied to the recording unit 23 is provided in the printer unit 12. That is, the liquid storage unit 50 supplies stored ink to the recording unit 23 through an ink supply path (not illustrated) which is configured of a tube, or the like, and the recording unit 23 prints an image, or the like, on the sheet P by ejecting the supplied ink. According to the embodiment, the liquid storage unit 50 is arranged on the side higher than the sheet P which is placed on the placing table 27 in the vertical direction Z. In addition, the liquid storage unit 50 is arranged so as to cover at least a part of the medium discharging path 34 when viewed from the higher side in the vertical direction Z.

That is, the higher side of the medium discharging path 34 which is the curved reverse path is formed in an inclined shape which faces one direction due to the straight path 34B which is continued from the curved path 34A. For this reason, in the printer unit 12, a space 12S is formed on the higher side between a portion on the higher side in the curved path 34A and the medium discharging port 26 of the straight path 34B which is in an inclined shaped.

According to the embodiment, the space 12S is formed in the printer unit 12 so as to cover the medium discharging path 34 when viewed from the higher side, in the width direction X. In addition, the liquid storage unit 50 is arranged so as to cover at least a part of the medium discharging path 34 when viewed from the higher side, in the space 12S. According to the embodiment, the liquid storage unit 50 is arranged so as to cover the entire medium discharging path 34 in the width direction X, when viewed from the higher side.

In the space 12S, a pair of transport rollers 25a which is located on the most downstream side of the sheet P in the transport direction on the medium discharging path 34, in the plurality of pair of transport rollers 25 which are provided on the medium discharging path 34, and function as a discharging roller is provided at a position which overlaps the liquid storage unit 50 when viewed in the horizontal direction.

In addition, in the space 12S, an air-blowing unit 57 which is located in a space except for a space which is occupied by the liquid storage unit 50, and on the side further downstream than the medium discharging port 26 in the discharging direction W of the sheet P, and blows air in the direction in which the sheet P which is discharged from the medium discharging port 26 is pressed to the placing face 28 side, is provided. The air-blowing unit 57 is configured of a rotating fan 58, and is provided at a position which overlaps the liquid storage unit 50 when viewed in the horizontal direction.

According to the embodiment, a pair of the air-blowing units 57 is provided in the width direction X of the sheet P so that an air blowing-off port thereof faces the both end portions of the sheet P in the width direction X around the convex portion 29 of the placing face 28. As a matter of course, one air-blowing unit 57 may be provided, and an air blowing-off port thereof may be formed in a shape which is continuous in the width direction X of the sheet P.

The liquid storage unit 50 is configured of ink cartridges 51, 52, 53, and 54 as liquid storage bodies which respectively store ink of a plurality of types (four colors here), and a frame body 55 on which each of the ink cartridges 51, 52, 53, and 54 is mounted. Each of the ink cartridges 51, 52, 53, and 54 is formed in an approximately rectangular parallelepiped shape with a longitudinal direction, and is mounted on the frame body 55 which is formed in a box shape of which one face is open, in an inserting-extracting manner through the opening, by setting the longitudinal direction to the inserting-extracting direction.

According to the embodiment, the inserting-extracting direction of each of the ink cartridges 51, 52, 53, and 54 is set to be a direction which goes along the width direction X. For this reason, an opening portion (not illustrated) to which an opening of the frame body 55 is exposed when viewed in the width direction X is formed in the printer unit 12, and the opening portion is included in a storage unit cover 56 (refer to FIG. 1) which is openable or closable. In addition, for example, it is possible for a user of the recording apparatus 11 to expose the opening portion (not illustrated) by opening the storage unit cover 56 (refer to FIG. 1), and to insert each of the ink cartridges 51, 52, 53, and 54 into the frame body 55 along the width direction X, or extract the ink cartridges from the frame body 55 through the exposed opening portion.

According to the embodiment, in each of the ink cartridges 51, 52, 53, and 54, the transverse direction thereof is set to be the vertical direction Z, the longitudinal direction thereof is set to be the width direction X, and the thickness direction thereof is set to be the horizontal direction which goes along the discharging direction W in a state of being mounted on the frame body 55. In addition, each of the ink cartridges 51, 52, 53, and 54 has the same length in the transverse direction (vertical direction Z), respectively, and is mounted on the frame body 55 in a state of being aligned in the thickness direction.

The ink carriage 54 among each of the ink cartridges 51, 52, 53, and 54 is set to be an ink cartridge which stores ink of a color of which the ejecting frequency from the recording unit 23 is highest (for example, black color), and is arranged at a position which is farthest from the placing table 27 side toward the opposite side with respect to the medium discharging port 26. In addition, the thickness of the ink cartridge 54 is set to be larger than those of other cartridges 51, 52, and 53, and it is possible for the ink cartridge 54 to store ink of a liquid amount which is larger than ink storage amounts of other cartridges 51, 52, and 53.

As illustrated in FIG. 2, a rectangular plate-shaped path forming member 61 which forms a part of the third medium supply path 33 as the reverse path which reverses the sheet P along with the placing table 27 is arranged between the recording unit 23 and the placing table 27 in the printer unit. That is, the third medium supply path 33 is formed using the lower face of the placing table 27 and a top face of the path forming member 61. The path forming member 61 is inclined so as to be high along the discharging direction W.

Figure 3:
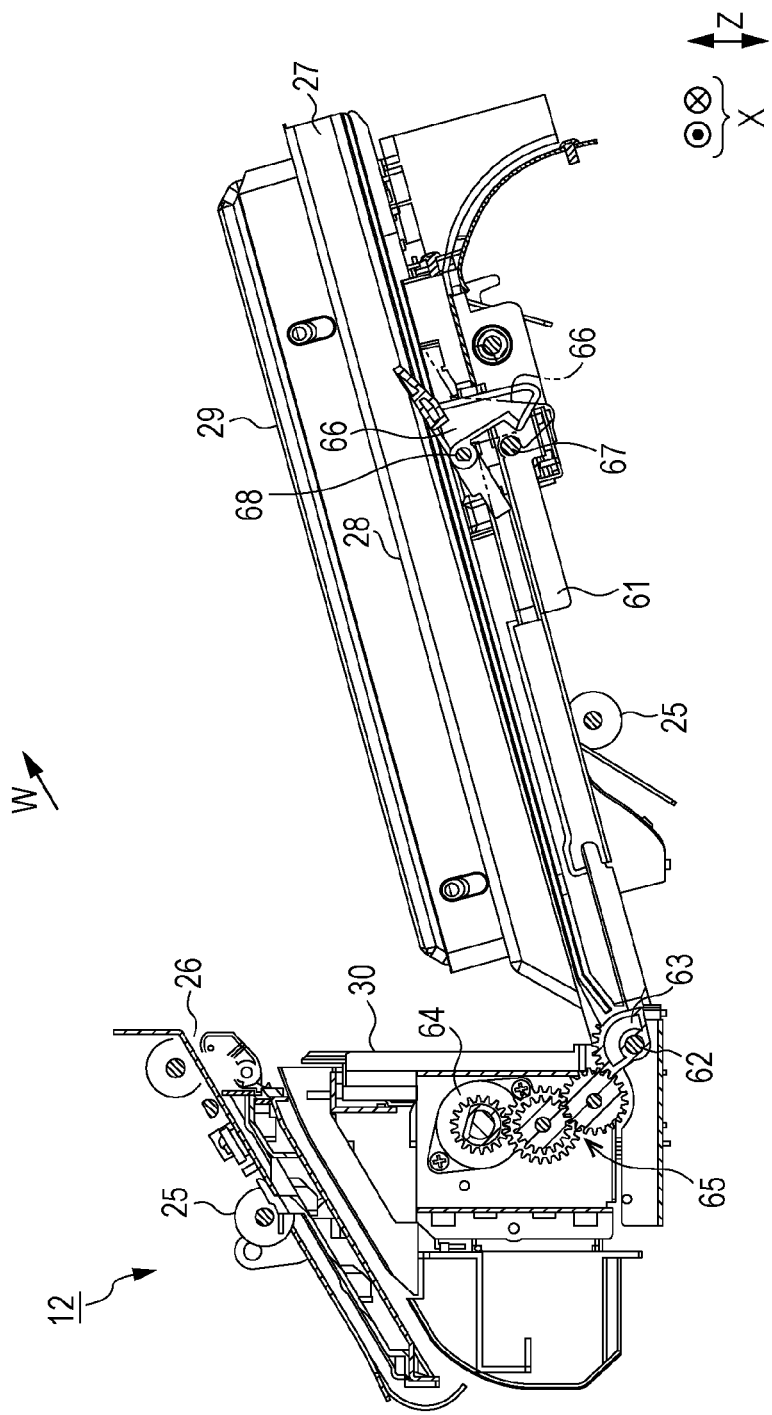
FIG. 3 is a side sectional view of a placing table and the periphery thereof in the recording apparatus.

As illustrated in FIG. 3, shafts 62 are provided so as to form a pair in the width direction X on the lower side of the vertical side wall 30 in the printer unit 12, and the pair of shafts 62 is extended in the width direction X. A fan-shaped sector gear 63 is provided at one end portion in the width direction X in an end portion of the placing table 27 on the upstream side in the discharging direction W, and a bearing unit (not illustrated) is provided at the other end portion. The sector gear 63 is connected to the shaft 62 on one side so as to be integrally rotated, and the bearing unit is supported by the shaft 62 on the other side so as to be rotated. Accordingly, the placing table 27 can rotate around the pair of shafts 62.

Figure 4:
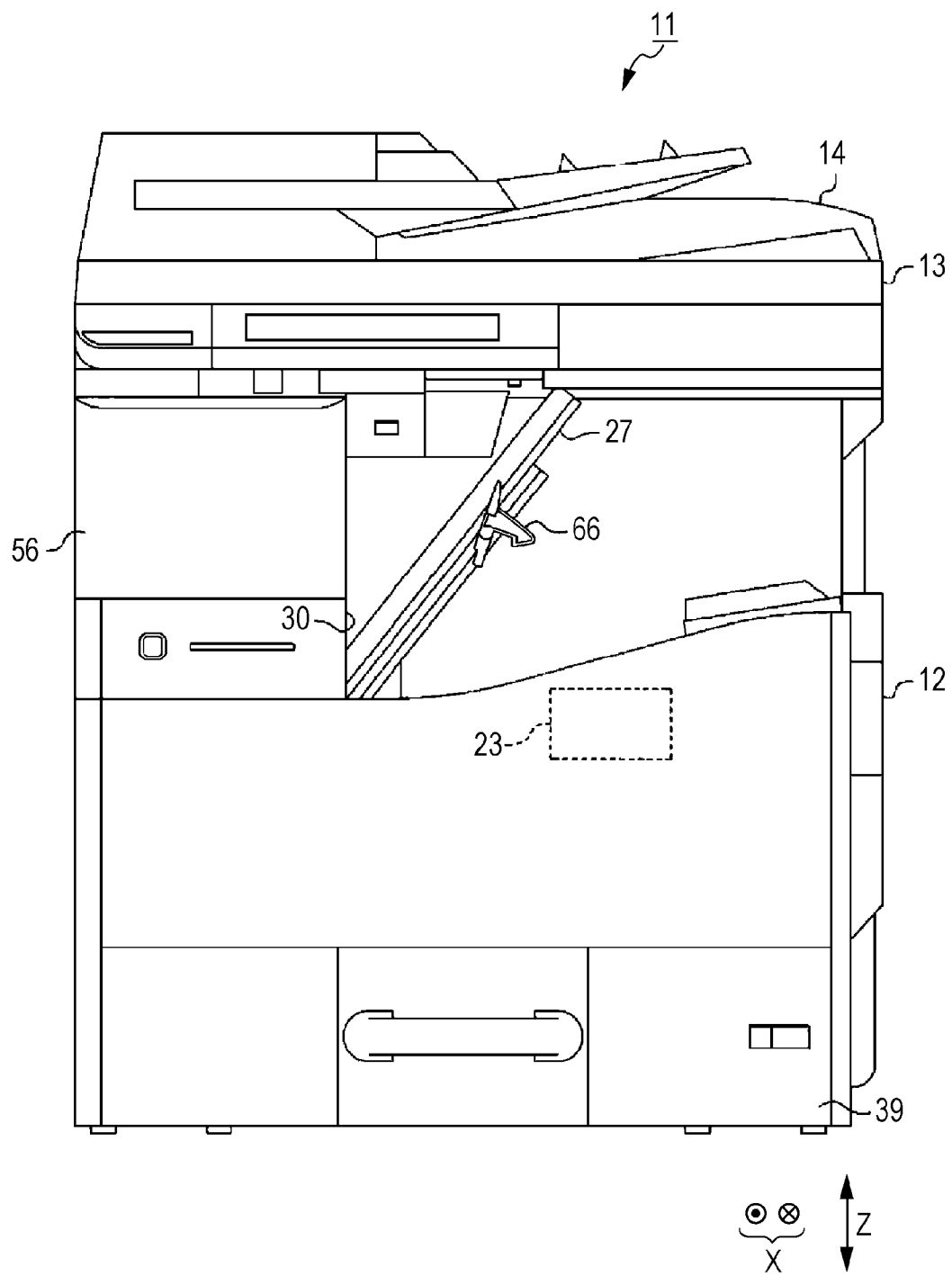
FIG. 4 is a front view which illustrates a state in which the placing table in the recording apparatus is at an open position.

That is, the placing table 27 is provided at the printer unit 12 in an openable-closable manner, and can rotate (opening-closing operation) between a closing position at which the printer unit 12 is closed (position in closed state which is illustrated in FIG. 1) and an open position at which the printer unit 12 is opened (position in open state which is illustrated in FIG. 4). Accordingly, an opening-closing fulcrum (center of rotation) when the placing table 27 performs the opening-closing operation (rotating operation) is located on the upstream side (left side in FIG. 3) in the discharging direction W.

In this case, the placing table 27 is configured so that a portion which overlaps the recording unit 23 when viewed from the above can be opened until the portion becomes smaller than that in the closed state. That is, the placing table 27 is configured so that the portion which overlaps the recording unit 23 when viewed from the above becomes small when at the open position compared to that of the closing position.

As illustrated in FIG. 3, a torque hinge 64 is provided on the side opposite to the placing table 27 in the vertical side wall 30 in the printer unit 12. The torque hinge 64 engages with the sector gear 63 through a gear mechanism 65 which includes a plurality of gears. In this case, the torque hinge 64 is usually urged in a direction in which the placing table 27 rotates toward the open position side with respect to the placing table 27 through the gear mechanism 65.

An urging force of the torque hinge 64 is not large to an extent of automatically rotating the placing table 27 toward the open position from the closing position, and is set to have a magnitude which can assist a user when the user rotates the placing table 27 from the closing position to the open position. In addition, the urging force of the torque hinge 64 is set to have a magnitude which is slightly larger than a force which is necessary when holding the placing table 27 which is rotated toward the open position to the open position.

Figure 5:
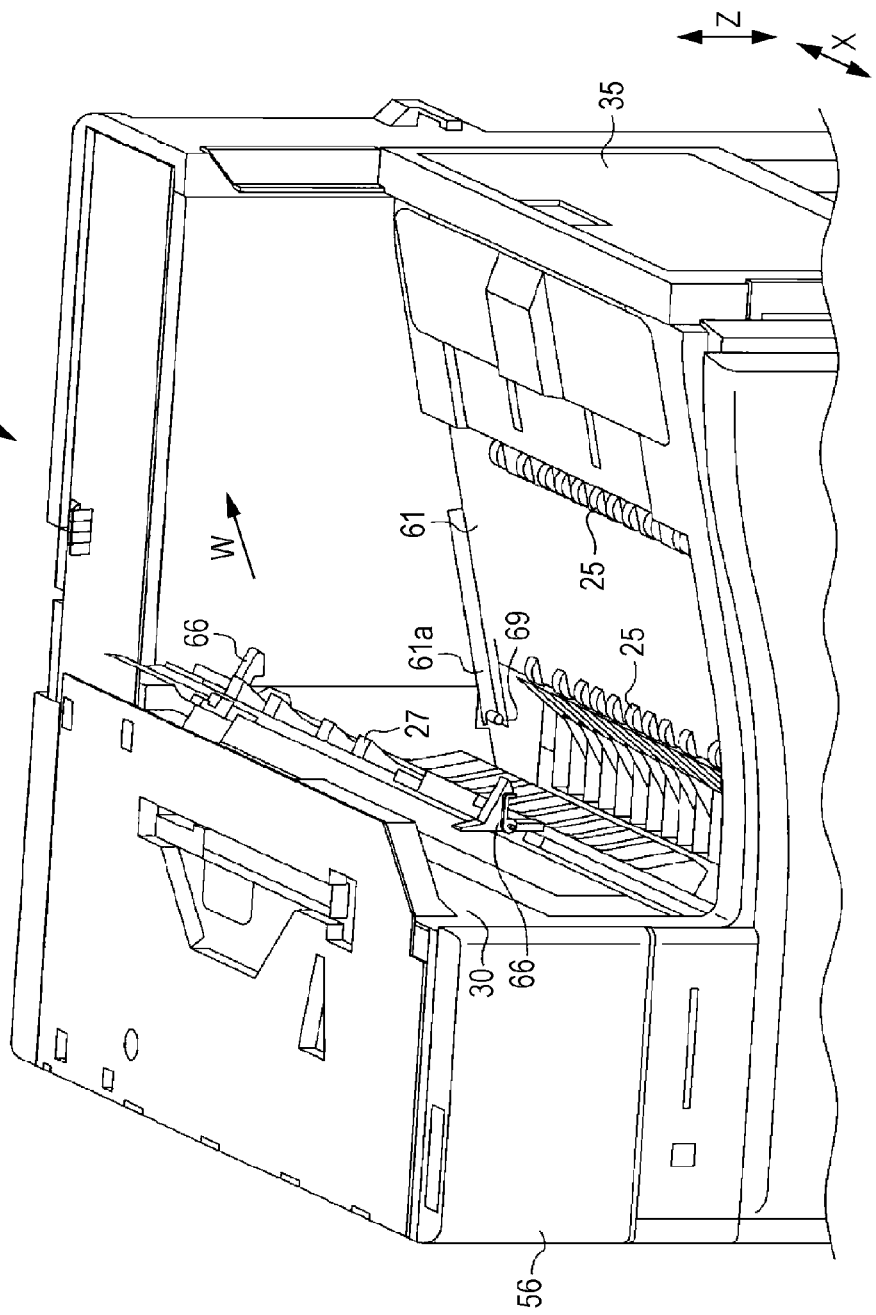
FIG. 5 is an enlarged perspective view of main portions which illustrates a state in which the placing table is opened by taking out a scanner unit, an automatic sheet feeder, and an operation unit from a printer unit in the recording apparatus.

As illustrated in FIGS. 3 and 5, locking levers 66 which can rotate around a shaft member 68 which is extended in the width direction X are respectively provided at both side portions of the placing table 27 in the width direction X. The two locking levers 66 can be respectively locked with pins 67 which are provided at both side portions of the path forming member 61 in the width direction X.

That is, each locking lever 66 can be rotated between a locking position at which the lever 66 is locked with each pin 67 (position denoted by two-dotted chain line in FIG. 3) and a releasing position (position denoted by solid line in FIG. 3) at which a locking state with each pin 67 is released, when the placing table 27 is at the closing position. In addition, each locking lever 66 is urged in a direction (clockwise in FIG. 3) in which the locking lever usually rotates around the shaft member 68 toward the locking position due to an urging member (not illustrated). Accordingly, when being at the closing position, the placing table 27 is held at the closing position against an urging force of the torque hinge 64 when each locking lever 66 is locked with each pin 67.

Figure 6:
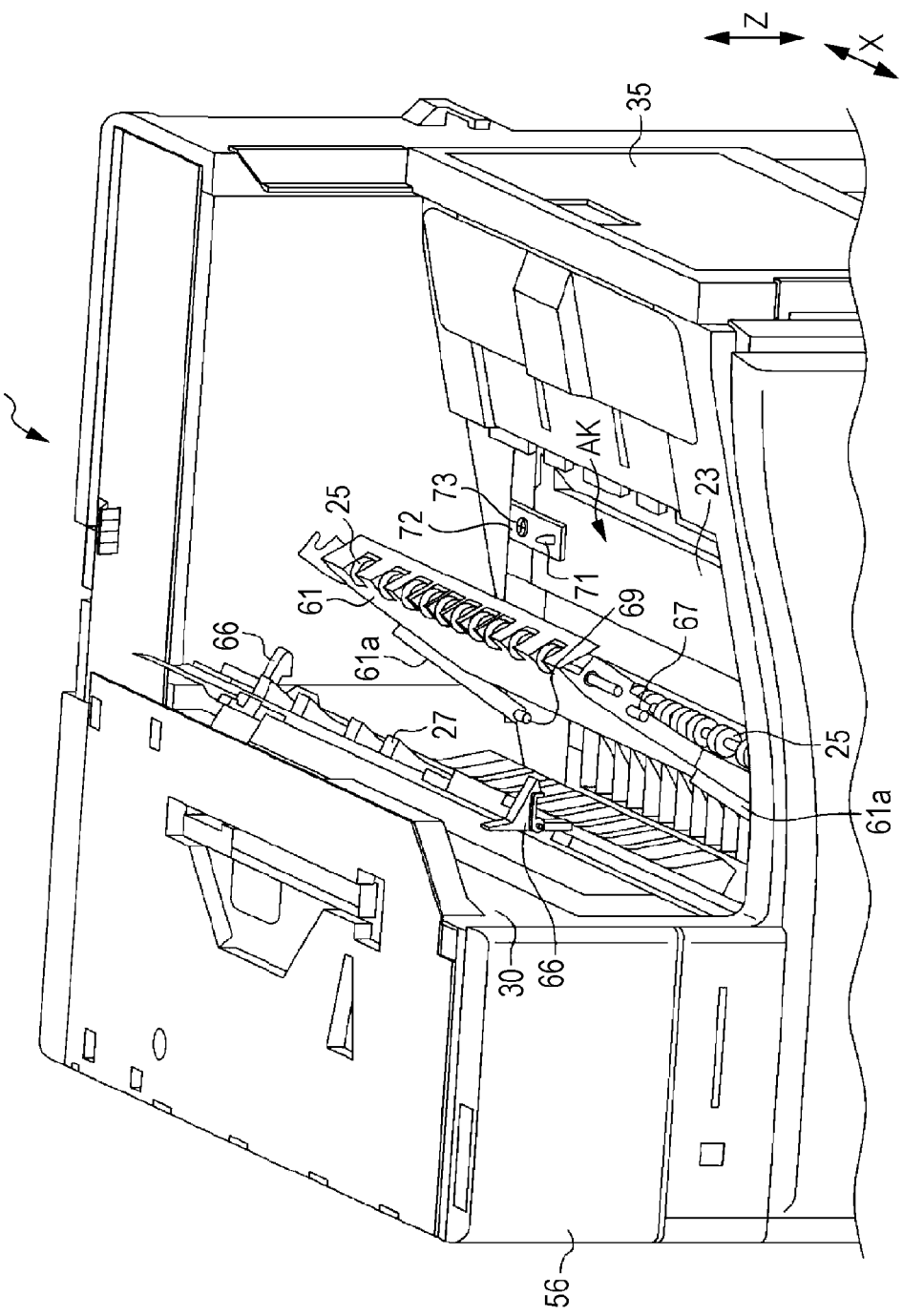
FIG. 6 is an enlarged perspective view of the main portions which illustrates a state in which a path forming member is opened in FIG. 5.

As illustrated in FIGS. 5 and 6, the path forming member 61 includes support arms 61a at both end portions in the width direction X at an end portion of the vertical side wall 30, respectively. At positions corresponding to tip end portions of the two support arms 61a in the printer unit 12, shaft units 69 are provided in a protruding manner along the width direction X, respectively. Each support arm 61a is rotatably and detachably supported at the tip end portion with respect to each shaft unit 69. Accordingly, the path forming member 61 can rotate around each shaft unit 69.

That is, the path forming member 61 is provided in an openable-closable manner with respect to the printer unit 12, and can rotate (opening-closing operation) between a closing position at which the printer unit 12 is closed (position in closed state illustrated in FIG. 5) and an open position at which the printer unit 12 is opened (position in open state illustrated in FIG. 6). Accordingly, an opening-closing fulcrum (center of rotation) when the path forming member 61 performs the opening-closing operation (rotating operation) is located on the upstream side (left side in FIG. 5) in the discharging direction W.

In this case, the path forming member 61 is configured so that a portion which overlaps the recording unit 23 when viewed from the above can be opened until the portion becomes smaller than that in the closed state. That is, the path forming member 61 is configured so that the portion which overlaps the recording unit 23 when viewed from the above becomes small when at the open position compared to that of the closing position.

The path forming member 61 is usually screwed with respect to the printer unit 12 using a screw (not illustrated) when at the closing position. Accordingly, the path forming member 61 can be taken out from the printer unit 12 when each support arm 61a is removed from each shaft unit 69, after releasing the screwed state with respect to the printer unit 12 by removing the screw. That is, the path forming member 61 is configured so as to be detached with respect to the printer unit 12.

Subsequently, an operation when performing maintenance work of the recording unit 23 in the recording apparatus 11 will be described.

Meanwhile, at a time of performing exchange work which is one of the types of maintenance work of the recording unit 23, when the recording unit 23 is taken out from the recording apparatus 11, first, as illustrated in FIG. 5, the scanner unit 13, the automatic sheet feeder 14, and the operation unit 15 are taken out from the printer unit 12. Subsequently, the placing table 27 is caused to be opened, and is rotated toward the open position in a state in which the locking lever 66 is rotated toward a release position. At this time, the placing table 27 is held at the open position due to the urging force of the torque hinge 64.

Subsequently, the screwed state of the path forming member 61 with respect to the printer unit 12 is released by removing the screw which fixes the path forming member 61 to the printer unit 12, and thereafter, as illustrated in FIG. 6, the path forming member 61 is caused to be opened, and is rotated toward the open position. In this manner, the recording unit 23 is exposed. That is, an access path AK, through which it is possible to access the recording unit 23 from the higher part from the outside of the printer unit 12, is formed by causing the path forming member 61 to be opened in a state in which the placing table 27 is opened.

Figure 7:
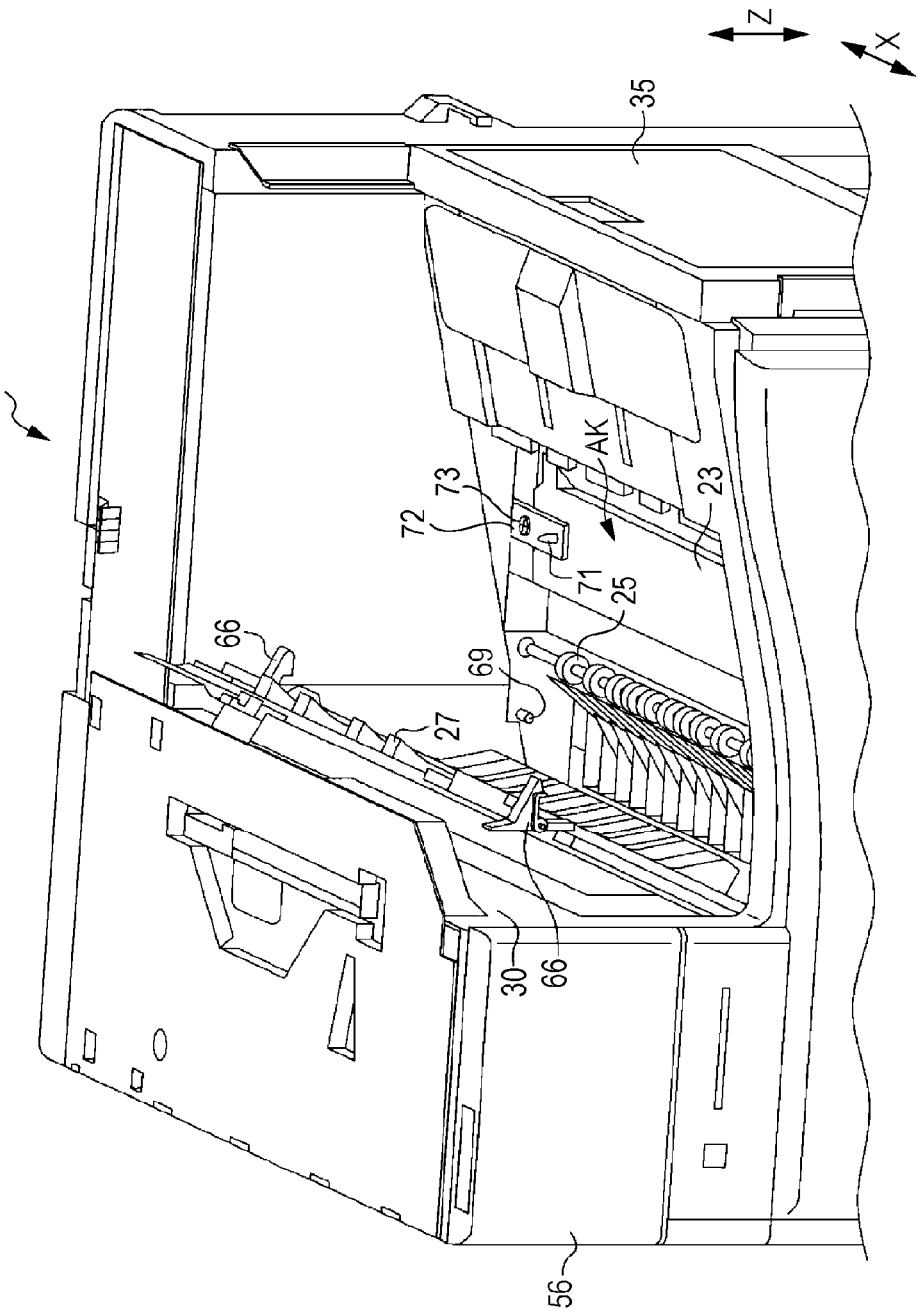
FIG. 7 is an enlarged perspective view of the main portions which illustrates a state in which the path forming member is taken out in FIG. 6.
Figure 8:
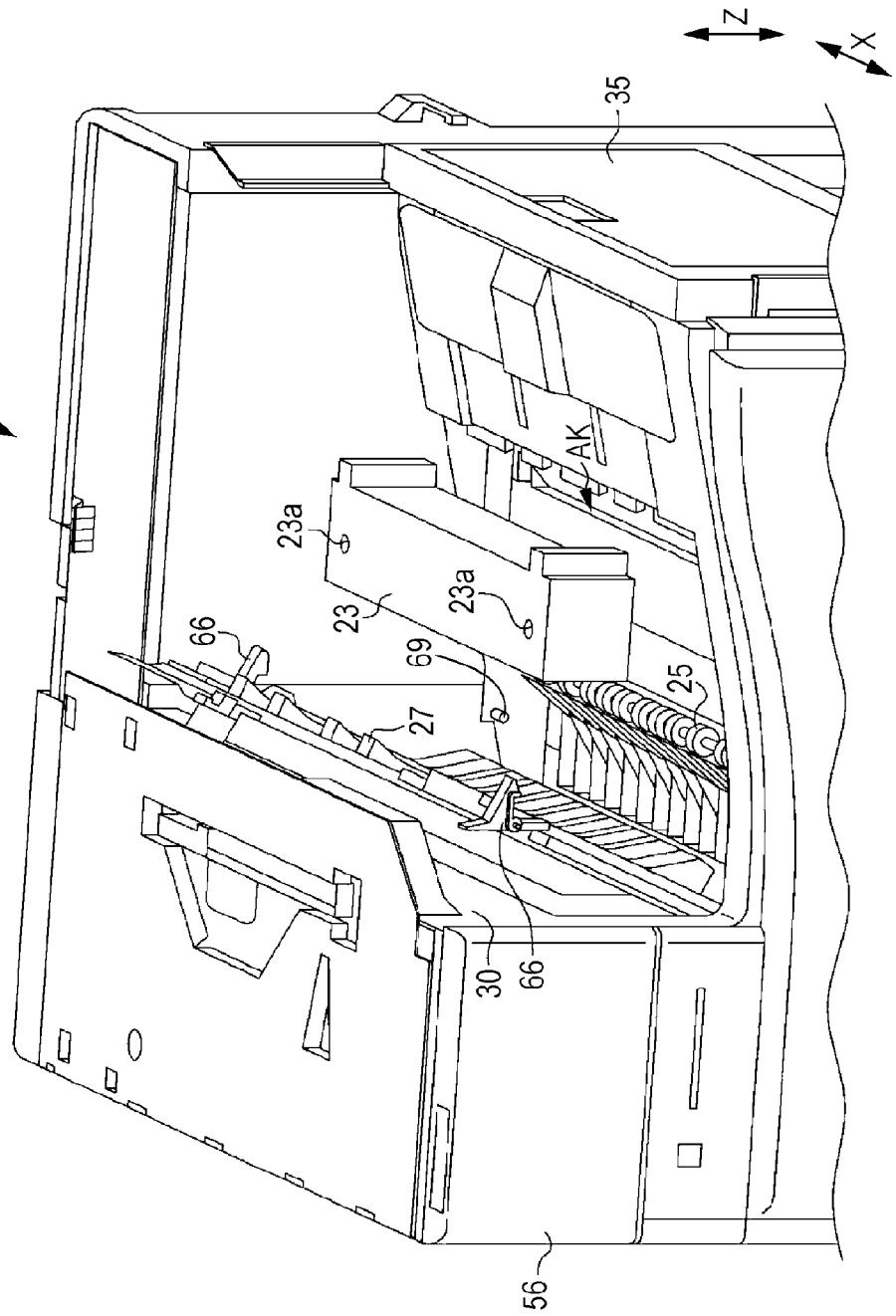
FIG. 8 is an enlarged perspective view of the main portions which illustrates a state in which a recording unit is taken out in FIG. 7.

Subsequently, as illustrated in FIG. 7, the path forming member 61 is taken out from the printer unit 12 by removing each support arm 61a of the path forming member 61 from each shaft unit 69. Subsequently, as illustrated in FIG. 8, the recording unit 23 is taken out from the inside of the printer unit 12 by accessing the recording unit 23 from the higher part through the access path AK. In addition, the taken out recording unit 23 is exchanged for a new one, and the new recording unit is assembled at a predetermined position in the printer unit 12.

Subsequently, the placing table 27 is rotated toward the closing position, after the path forming member 61 is attached to the original position in the printer unit 12. Thereafter, the scanner unit 13, the automatic sheet feeder 14, and the operation unit 15 are assembled in the printer unit 12, and the work is completed.

Subsequently, an attaching structure of the recording unit 23 with respect to the printer unit 12 will be described.

Figure 9:
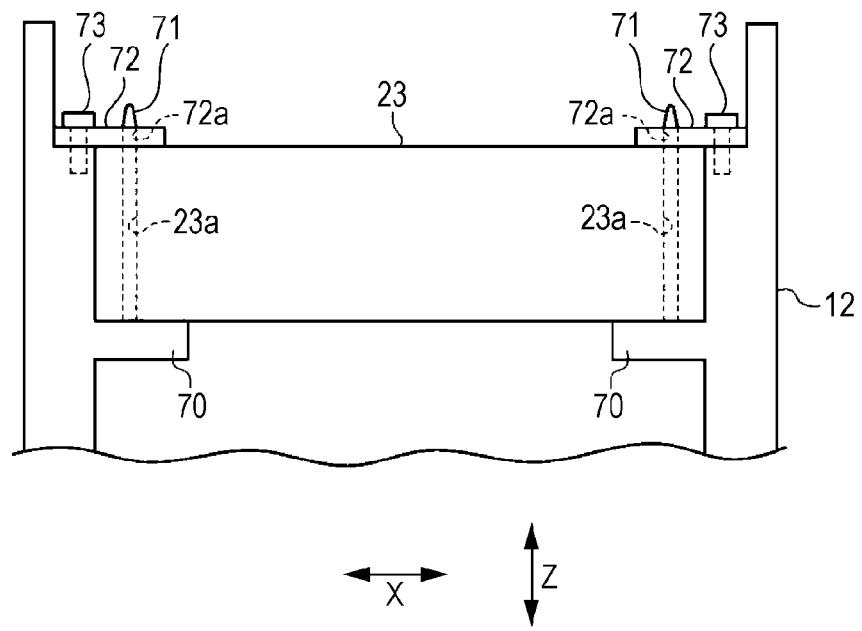
FIG. 9 is an enlarged perspective view of the main portions which illustrates a state in which the recording unit is attached to the printer unit.

As illustrated in FIG. 9, plate-shaped support pieces 70 which support the recording unit 23 are respectively provided on both side faces in the printer unit 12 in the width direction X in a protruding manner, and the pins 71 are erected on each of the support pieces 70. Insertion holes 23a which can be inserted into the pin 71 are formed so as to penetrate the insertion hole in the vertical direction Z at both end portions of the recording unit 23 in the width direction X. In addition, when each pin 71 is inserted into each insertion hole 23a, the recording unit 23 is supported by each support piece 70. At this time, positioning of the recording unit 23 in the horizontal direction which is orthogonal to the vertical direction Z is performed using each pin 71.

Both of the end portions on a top face of the recording unit 23 in the width direction X are supported so as to be pressed from the higher side, respectively, using approximately rectangular-shaped fastening plates 72. That is, in each fastening plate 72, a tip end portion of the pin 71 is inserted into a through hole 72a which is provided at one end portion, and the other end portion is fixed to the printer unit 12 using a screw 73. At this time, positioning of the recording unit 23 in the vertical direction Z is performed using each fastening plate 72.

Figure 10:
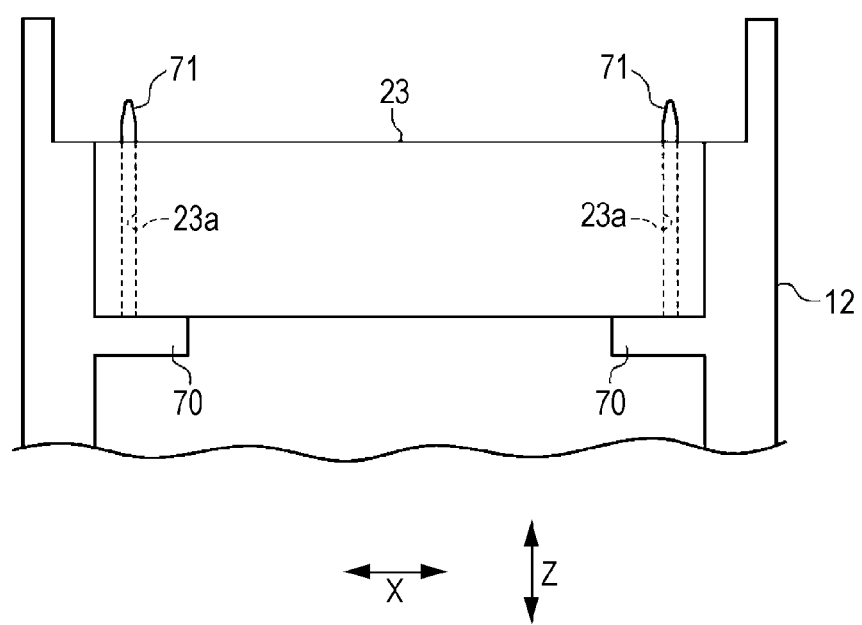
FIG. 10 is an enlarged perspective view of the main portions which illustrates a state in which a fastening plate is taken out from the printer unit in FIG. 9.
Figure 11:
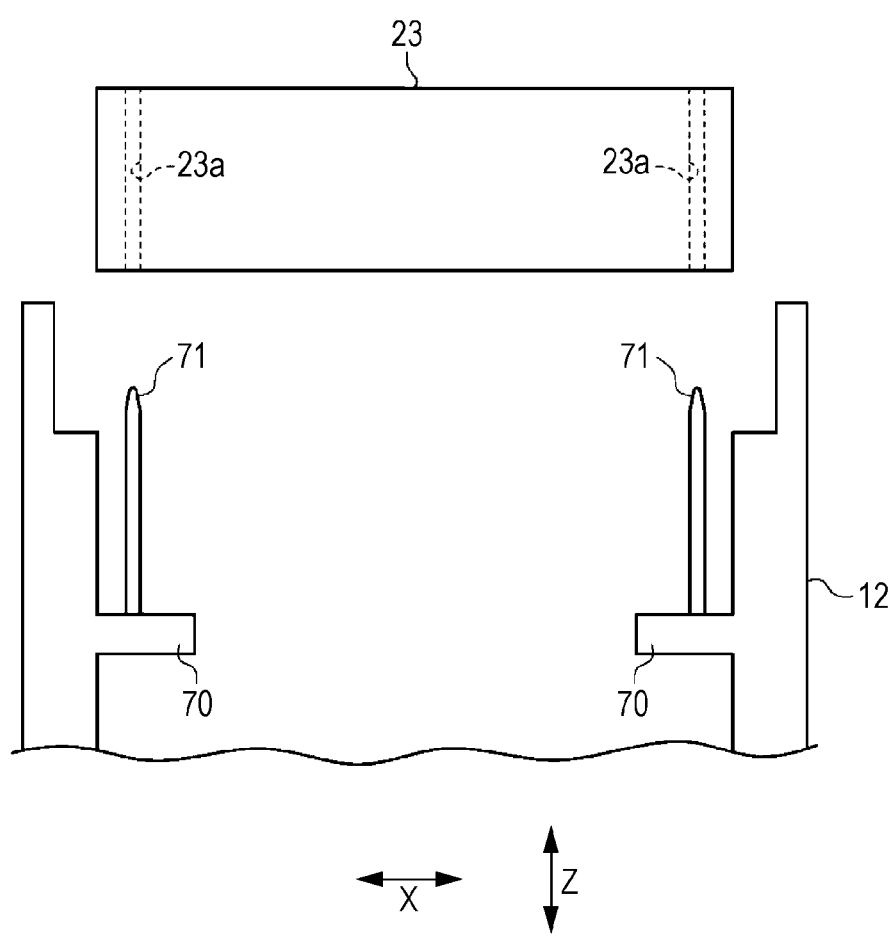
FIG. 11 is an enlarged perspective view of the main portions which illustrates a state in which the recording unit is taken out from the printer unit in FIG. 10.

In addition, when taking out the recording unit 23 from the printer unit 12, as illustrated in FIG. 10, first, each fastening plate 72 is taken out by removing each screw 73. Thereafter, as illustrated in FIG. 11, when lifting the recording unit 23 upward, each pin 71 falls out from each insertion hole 23a, and the recording unit 23 is taken out from the printer unit 12.

Meanwhile, when the recording unit 23 is attached to the printer unit 12, as illustrated in FIG. 10, first, each pin 71 is inserted into each insertion hole 23a, and the recording unit 23 is supported by each support piece 70. Thereafter, as illustrated in FIG. 9, the recording unit 23 is attached to the printer unit 12 when each fastening plate 72 is fixed to the printer unit 12 using each screw 73, in a state in which each pin 71 is inserted into the through hole 72a of each fastening plate 72.

As described above, according to the above described embodiment, it is possible to obtain the following effects.

(1) In the recording apparatus 11, the access path AK through which it is possible to access the recording unit 23 from the higher part from the outside of the printer unit 12 is formed by causing the path forming member 61 to be opened in a state in which the placing table 27 which is a part of the printer unit 12 is opened. For this reason, it is possible to access the recording unit 23 from the higher part through the access path AK from the outside of the printer unit 12. In addition, the recording unit 23 does not move when the placing table 27 and the path forming member 61 are caused to be opened. Accordingly, it is possible to easily perform maintenance work such as exchanging work of the recording unit 23 while securing the positional accuracy of the recording unit 23.

(2) In the recording apparatus 11, the placing table 27 and the path forming member 61 are configured so that portions which overlap the recording unit 23 when viewed from the above can be opened until the portions become smaller than those in the closed state, respectively. It is possible to access the recording unit 23 from the higher part by opening the placing table 27 and the path forming member 61.

(3) In the recording apparatus 11, the placing table 27 is inclined so as to be high along the discharging direction W in which the sheet P is discharged, and the opening-closing fulcrum when the placing table 27 is opened is located at a position on the upstream side in the discharging direction W. For this reason, it is possible to easily open the placing table 27.

(4) In the recording apparatus 11, the path forming member 61 is inclined so as to be high along the discharging direction W in which the sheet P is discharged, and the opening-closing fulcrum when the path forming member 61 is opened is located at a position on the upstream side in the discharging direction W. For this reason, it is possible to easily open the path forming member 61.

(5) In the recording apparatus 11, the path forming member 61 is detachably configured with respect to the printer unit 12. For this reason, it is possible to further easily access the recording unit 23 from the higher part by removing the path forming member 61 from the printer unit 12.

Modification Example

In addition, the above described embodiment may be modified as follows.

In the recording apparatus 11, the placing table 27 may be detachably configured with respect to the printer unit 12. In this manner, it is possible to further easily access the recording unit 23 from the higher part by taking out the placing table 27 from the printer unit 12.

In the recording apparatus 11, the path forming member 61 is not necessarily configured so as to be detached from the printer unit 12.

In the recording apparatus 11, the path forming member 61 is not necessarily inclined so as to be high along the discharging direction W in which the sheet P is discharged. In addition, the opening-closing fulcrum when the path forming member 61 is opened is not necessarily located on the upstream side in the discharging direction W.

In the recording apparatus 11, the placing table 27 is not necessarily caused to be inclined so as to be high along the discharging direction W in which the sheet P is discharged. In addition, the opening-closing fulcrum when the placing table 27 is opened is not necessarily located on the upstream side in the discharging direction W.

In the recording apparatus 11, it is not necessary to configure the placing table 27 and the path forming member 61 so that portions which overlap the recording unit 23 when viewed from the above are necessarily opened until the portions become smaller than those in the closed state, respectively.

In the recording apparatus 11, exchanging work (maintenance work) of the recording unit 23 may be performed without taking out the scanner unit 13, the automatic sheet feeder 14, and the operation unit 15 from the printer unit 12.

In the recording apparatus 11, exchanging work of the recording unit 23 may be performed in a state in which the path forming member 61 is held at the open position. In this case, it is preferable to provide a hook, or the like, for holding the path forming member 61 at the open position.

In the recording apparatus 11, exchanging work of the recording unit 23 may be performed in a state in which the placing table 27 is taken out from the printer unit 12.

In the recording apparatus 11, the third medium supply path 33 may be omitted. That is, the path forming member 61 may be omitted in the recording apparatus 11. In this case, the access path AK through which it is possible to access the recording unit 23 from the higher part from the outside of the printer unit 12 is formed only by causing the placing table 27 to be opened.

The medium may also be cloth, a plastic film, or the like, not only the sheet P.

The path forming member 61 which forms a part of the third medium supply path 33 which is the reverse path on which the sheet P is reversed is arranged between the recording unit 23 and the placing table 27 in the recording apparatus 11 in FIG. 2; however, the invention is also applied to a recording apparatus which does not include the path forming member 61. In a recording apparatus 11a in FIG. 26, the path forming member 61, the branching mechanism 43, the pair of branching transport path rollers 45, the branching transport path 44, the third driving roller 46a, and the third driven roller 46b in FIG. 2 are not provided. In addition, the pair of transport rollers 25 is not provided on the higher side of a recording unit 23.

Figure 26:
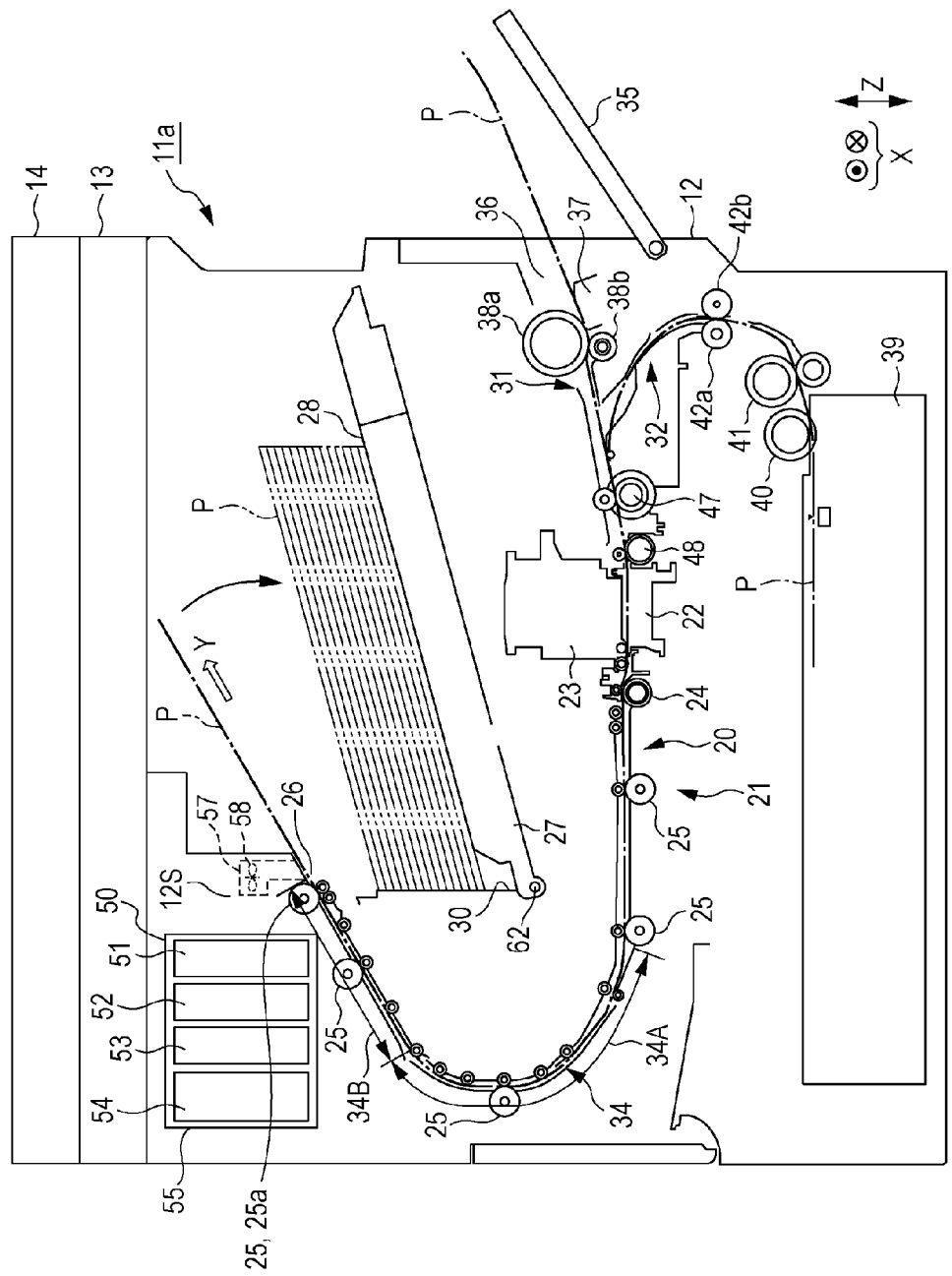
FIG. 26 is a structural diagram which schematically illustrates a recording apparatus which does not include a reverse path.

A placing table 27 in the recording apparatus 11a in FIG. 26 is provided so as to rotate around a pair of shafts 62, similar to the recording apparatus 11 in FIG. 2. In the recording apparatus 11a, the placing table 27 is configured so that a portion which overlaps the recording unit 23 when viewed from the above can be opened until the portion becomes smaller than that in the closed state. It is possible to easily access the recording unit 23 from the higher part by opening the placing table 27. Other configurations of the recording apparatus 11a are the same as those in the recording apparatus 11.

Second Embodiment

Hereinafter, as another embodiment of the recording apparatus, an ink jet printer which includes a recording unit which ejects ink as an example of liquid, and prints (records) an image including characters, figures, or the like, by ejecting ink onto a sheet which is an example of a medium will be described with reference to drawings.

Figure 12:
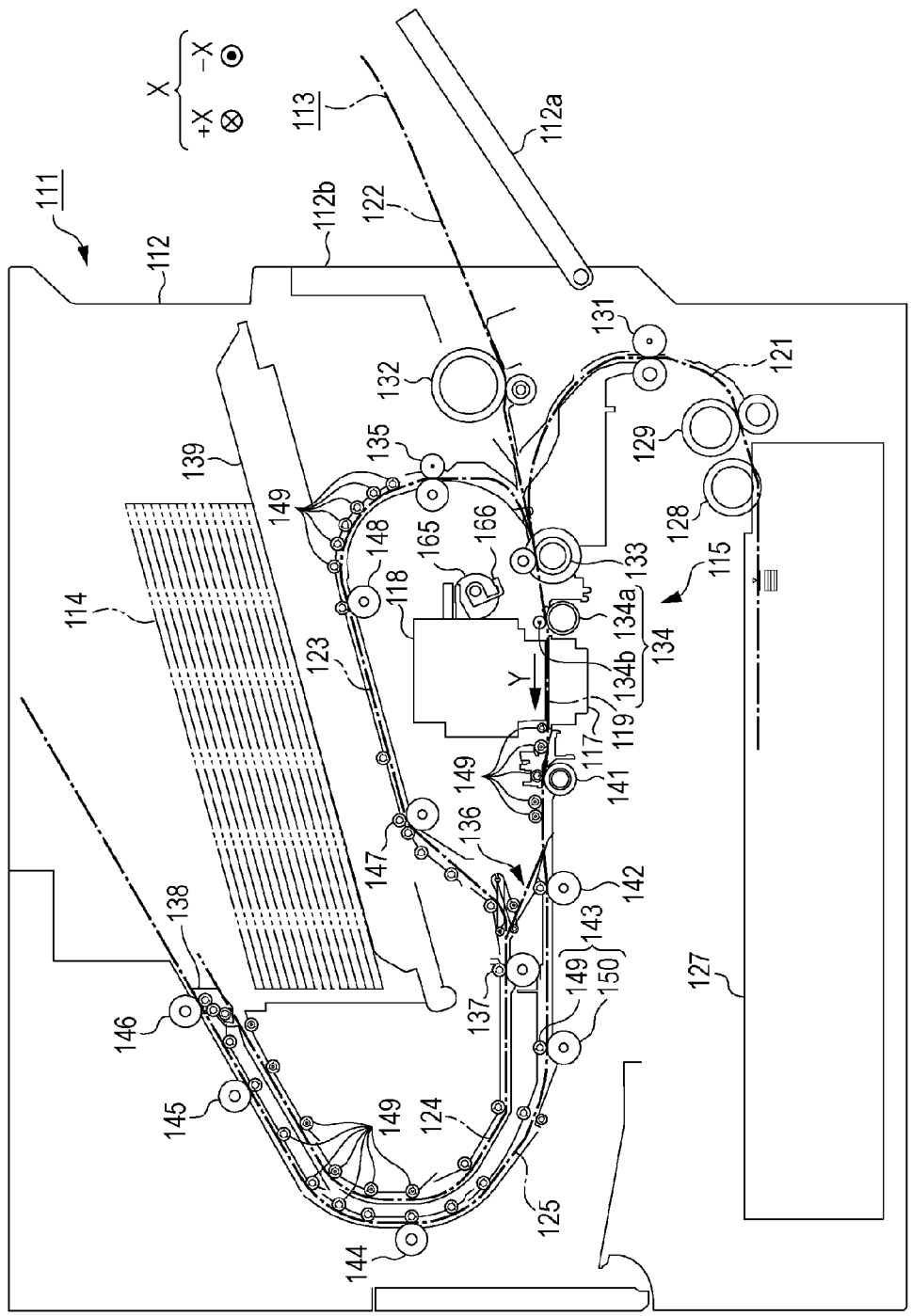
FIG. 12 is a structural diagram which schematically illustrates a recording apparatus according to a second embodiment.

As illustrated in FIG. 12, a printer 111 as an example of the recording apparatus in the embodiment includes an approximately rectangular parallelepiped-shaped housing 112, and a plurality of pair of rollers which transport a sheet 114 along a transport path 113 which is denoted by one-dotted chain line in FIG. 12. In addition, a support table 117 which supports the sheet 114 from the gravity direction side, and a recording unit 118 which is arranged so as to face the support table 117 through the transport path 113 are provided on the transport path 113.

The recording unit 118 is a so-called line head which includes a liquid ejecting head 170 (refer to FIG. 14) which can eject ink at the same time over the width direction X which intersects (orthogonal, here) the transport direction Y, and performs printing by ejecting ink toward the sheet 114 which passes through in a state of being supported by the support table 117. In addition, in the following descriptions, a position between the support table 117 and the recording unit 118 in the transport path 113 will be referred to as a printing position 119.

The transport path 113 is configured of a first supply path 121 and a second supply path 122 on the side further upstream than the printing position 119 in the transport direction Y, a third supply path 123 on the side further downstream than the printing position 119 in the transport direction Y, a branching path 124, and a discharging path 125.

The first supply path 121 is a path which connects a sheet cassette 127 which is provided at a base portion which is a gravity direction side of the housing 112 in an inserting-extracting manner and the printing position 119. In addition, a pickup roller 128 which sends out a top sheet 114 in sheets 114 which are placed in the sheet cassette 127 in a stacked state, and a separation roller 129 which separates the sheet 114 which is sent out using the pickup roller 128 into one sheet are provided on the first supply path 121. In addition, a first pair of supply rollers 131 is provided on the side further downstream than a separation roller 129 in the transport direction.

The second supply path 122 is a path which connects an insertion port 112b which is exposed when a cover 112a which is provided on one side face of the housing 112 is opened and the printing position 119. In addition, a second pair of supply rollers 132 which transports the sheet 114 which is inserted from the insertion port 112b by interposing therebetween is provided in the second supply path 122. In addition, a third pair of supply rollers 133 and a fourth pair of supply rollers 134 are provided at a position at which the first supply path 121, the second supply path 122, and the third supply path 123 join, and a fifth pair of supply rollers 135 is provided on the third supply path 123.

The third supply path 123 is a path which is provided so as to surround the recording unit 118, and is a path which returns the sheet 114 which temporarily passes through the printing position 119 to the side further upstream than the printing position 119 again. That is, a branching mechanism 136 is provided on the side further downstream than the printing position 119, and a pair of branching rollers 137 which can perform a bidirectional rotation of a normal rotation and a reversal rotation is provided on the branching path 124 which is branched from the discharging path 125.

The discharging path 125 is a path which connects a discharging port 138 from which a printed sheet 114 is discharged and the printing position 119. In addition, the sheet 114 which is discharged from the discharging port 138 is placed on a placing table 139. In addition, at least one (six in the embodiment) of the first pair of transport rollers 141 to the sixth pair of transport rollers 146 is provided on the discharging path 125. In addition, a seventh pair of transport rollers 147 and an eighth pair of transport rollers 148 are provided also on the third supply path 123. The first pair of transport rollers 141 to the eighth pair of transport rollers 148 transport a sheet 114 onto which ink is attached by interposing therebetween.

That is, the first pair of transport rollers 141 to the eighth pair of transport rollers 148 are configured of a columnar driving roller 150 which rotates based on a driving force of a driving source, and a toothed roller 149 which is rotated along a rotation of the driving roller 150. The toothed roller 149 is also solely provided without forming a pair with the driving roller 150. That is, the toothed roller 149 is provided on the side on which a printing face of the sheet 114 on which printing is performed (that is, face onto which ink as an example of liquid is attached by being ejected) passes through on the third supply path 123, the branching path 124, and the discharging path 125. The toothed roller 149 is also provided between each pair of transport rollers of the first pair of transport rollers 141 to the eighth pair of transport rollers 148, and is also provided between each pair of transport rollers and the recording unit 118 in the transport direction. Meanwhile, the driving roller 150 is provided on the side on which a non-printing face (non-recording face) of the sheet 114 on which printing is not performed, or a face on which printing is performed in advance when it is a sheet 114 which is subjected to double-sided printing passes through.

According to the embodiment, in the printing position 119, at least the fourth pair of supply roller 134 faces the recording unit 118, and functions as a transport unit 115 which transports the sheet 114 in a state of being supported by the support table 117. In addition, the fourth pair of supply roller 134 includes a driving roller 134a which is rotatably driven by a driving source (not illustrated), and a driven roller 134b which rotates according to the driving roller 134a, and transports the sheet 114 by interposing the sheet between these rollers. For this reason, the driving roller 134a is set to a roller of which the surface is subjected to antislip processing so that the sheet 114 does not slip.

Figure 13:
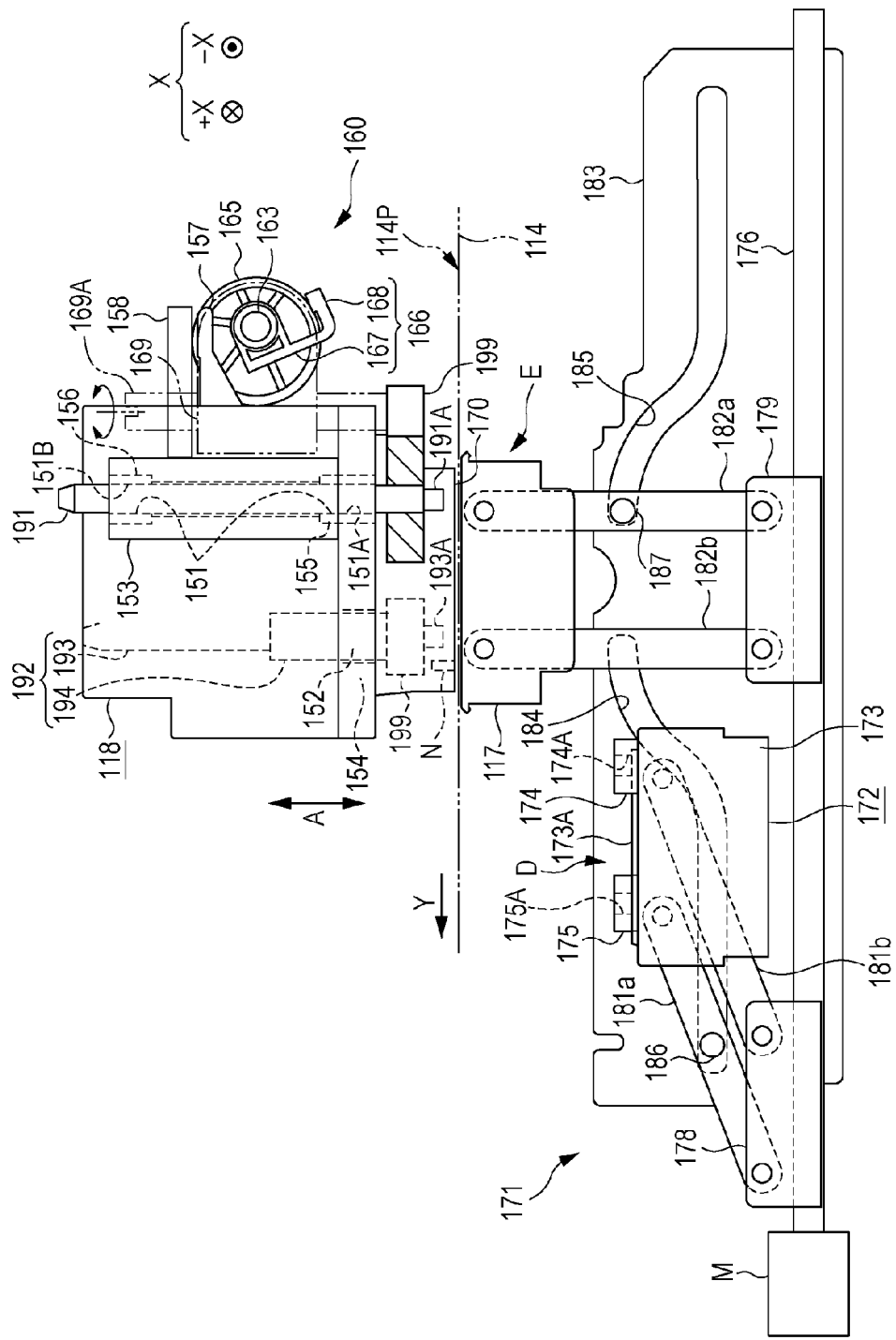
FIG. 13 is a schematic diagram of a switching mechanism which switches a supporting table and a cap with respect to the recording unit.
Figure 18:
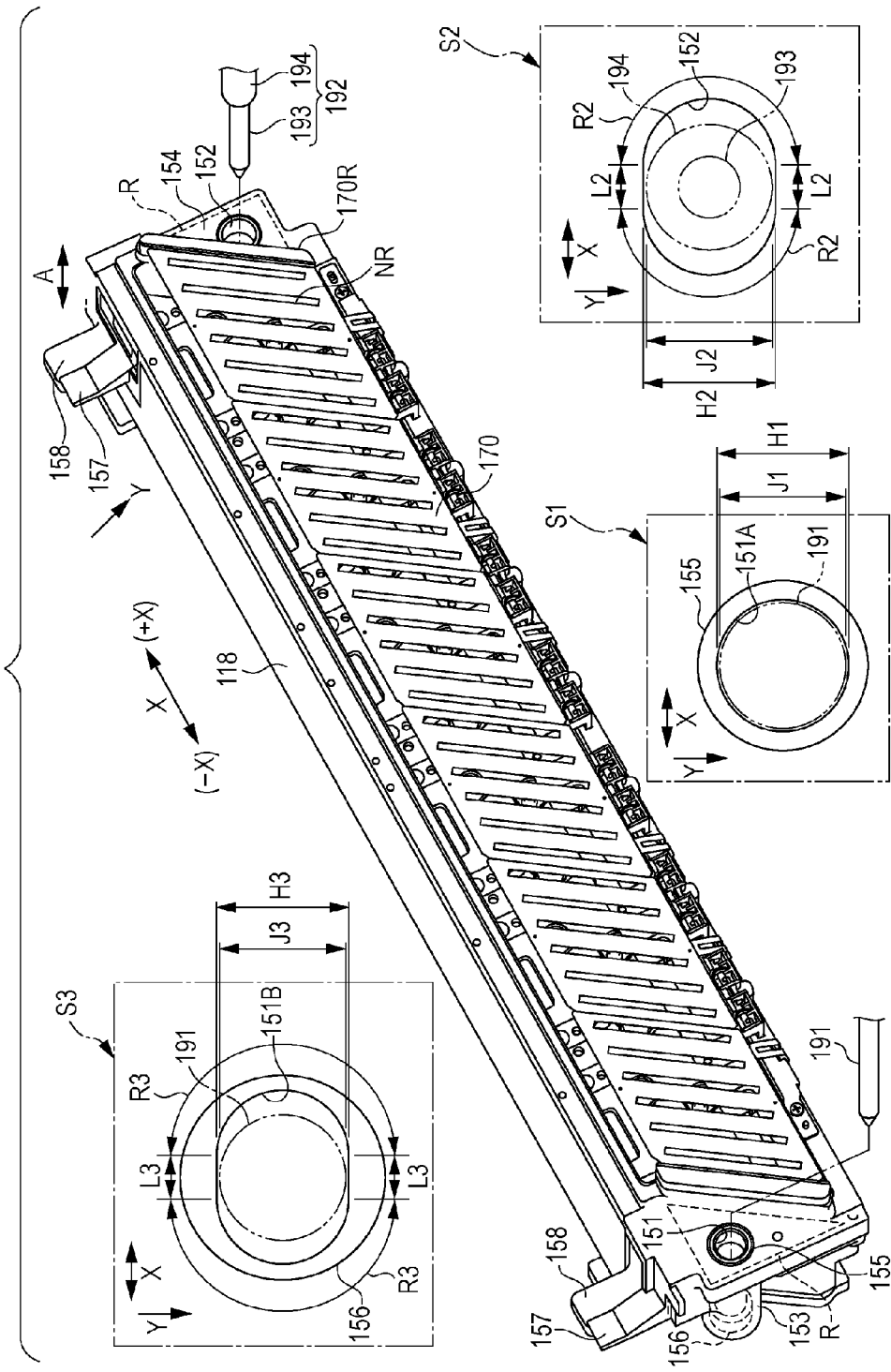
FIG. 18 is a perspective view in which the recording unit is viewed from a liquid ejecting head side.

As illustrated in FIG. 13, the recording unit 118 is provided with a cylindrical unit 153 which includes a through hole of one end side 151 (−X side here) in the width direction X, and is provided with a flat plate unit 154 which includes a through hole of the other end side 152 on the other end side (+X side here) (refer to FIG. 18). An insertion shaft of one end side 191 and an insertion shaft of the other end side 192 which are provided in a base stand unit 199 (refer to FIGS. 16 and 19) which is provided in the housing 112 are respectively inserted into the through hole of one end side 151 and the through hole of the other end side 152, and the recording unit 118 is positioned in the transport direction Y.

According to the embodiment, the through hole of one end side 151 of the cylindrical unit 153 is formed of a first bush 155 and a second bush 156 which are mounted on the cylindrical unit 153 with an interval in a shaft line direction of the insertion shaft of one end side 191 of which a shaft plane is circular. That is, on the cylindrical unit 153, the first bush 155 and the second bush 156 are mounted at a side end portion which is close to the support table 117, and at a side end portion which is far from the support table 117, respectively, in the insertion direction of the insertion shaft of one end side 191.

A first through hole 151A as a circular hole is provided in the first bush 155, and a second through hole 151B (refer to FIG. 18) as a long circular hole which is an example of an elongated hole which has a linear parallel edge portion L3 which goes along the longitudinal direction (width direction X) of the recording unit 118, and other portions are set to a semicircular edge portion R3 is provided in the second bush 156. Accordingly, the first through hole 151A, and the second through hole 151B which is provided at a position far from a recording face 114P of the sheet 114 compared to the first through hole 151A, and into which the insertion shaft of one end side 191 is inserted are provided at one end side of the recording unit 118 in the longitudinal direction. The through hole of one end side 151 into which the insertion shaft of one end side 191 is inserted is formed of the circular first through hole 151A and the long circular-shaped second through hole 151B.

Meanwhile, the through hole of the other end side 152 which is provided in the flat plate unit 154 is provided as a long circular hole (refer to FIG. 18) as an example of an elongated hole which has a linear parallel edge portion L2 which goes along the longitudinal direction (width direction X) of the recording unit 118, and other portions are set to a semicircular edge portion R2. In addition, the insertion shaft of the other end side 192 which is inserted into the long circular-shaped through hole of the other end side 152 is configured of a fixed shaft of the other end side 193 which is fixed to the base stand unit 199, and of which a shaft plane is circular, and an eccentric cylindrical member 194 which has a cylindrical face with a shaft line which is eccentric by a predetermined dimension from a central shaft line of the fixed shaft of the other end side 193 as a center shaft on the outer face, and of which the cylindrical face can rotate around the fixed shaft of the other end side 193.

In addition, the insertion shaft of one end side 191 is a fixed shaft of one end side which is fixed to one end side of the base stand unit 199, and a shaft protruding unit of one end side 191A which protrudes to the sheet 114 side from a portion fixed to the base stand unit 199 is provided in the insertion shaft of one end side 191. In addition, a shaft protruding unit of the other end side 193A which protrudes to the sheet 114 side from the base stand unit 199, similarly, is provided in the fixed shaft of the other end side 193 which is fixed to the other end side of the base stand unit 199. The shaft protruding unit of one end side 191A and the shaft protruding unit of the other end side 193A are used when positioning a cap 172 with respect to the recording unit 118, which will be described later.

According to the embodiment, the width direction X as the longitudinal direction of the recording unit 118 is set to a direction which intersects both directions of the transport direction Y of a sheet 114 using the transport unit 115 and a direction which goes along a normal line of the recording face 114P of the sheet 114. In addition, the through hole of one end side 151 and the through hole of the other end side 152 which are provided at both end portions in the longitudinal direction, respectively, are set to through holes which performs penetrating in a direction which goes along the normal line of the recording face 114P, and shaft line directions of the insertion shaft of one end side 191 and the insertion shaft of the other end side 192 (in detail, the fixed shaft of the other end side 193) which are insertion shafts inserted into the through hole are set to directions which go along the normal line of the recording face 114P of the sheet 114.

Accordingly, the recording unit 118 moves along the normal line direction of the recording face 114P of the sheet 114 when the through hole of one end side 151 and the through hole of the other end side 152 which are provided at both sides in the longitudinal direction (width direction X) move in shaft line directions of the insertion shaft of one end side 191 and the insertion shaft of the other end side 192 (in detail, eccentric cylindrical member 194) which are respectively inserted thereto. As a result, in the recording unit 118, a size of an interval with the sheet 114 (or support table 117) which is transported on the transport path 113 is adjusted due to a movement thereof with respect to the sheet 114 (or support table 117) in which the recording unit is separated from the sheet or gets closer to the sheet.

Subsequently, a structure of adjusting an interval between the recording unit 118 and the sheet 114 will be described. In addition, the shaft line directions of the insertion shaft of one end side 191 and the insertion shaft of the other end side 192, that is, a direction in which the recording unit 118 can move will be described as a movement direction A.

Figure 14:
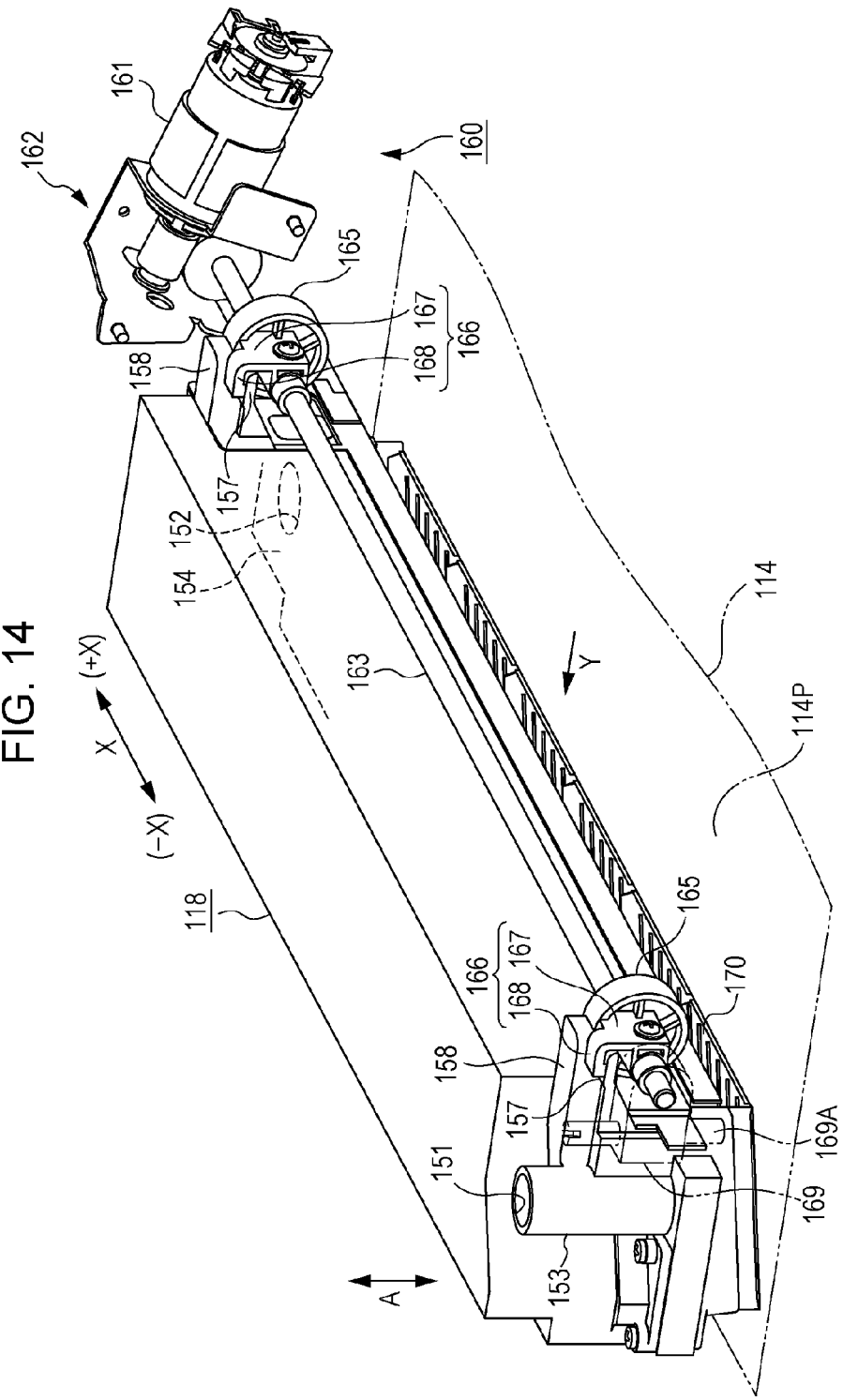
FIG. 14 is a perspective view of a bearing movement mechanism which relatively moves the recording unit with respect to a recording face of a medium.

As illustrated in FIGS. 13 and 14, in the recording unit 118, at least one engaged portion 157, and a plurality of follower portions 158 are formed by being protruded from a side face on the upstream side of the recording unit 118 in the transport direction Y. In addition, according to the embodiment, two sets of the engaged portion 157 and the follower portion 158 are provided with an interval in the width direction X, respectively, by setting one engaged portion 157 and one follower portion 158 which are adjacent to each other in the width direction X to one set.

The engaged portion 157 and the follower portion 158 are provided so that positions thereof are deviated in the width direction X and the movement direction A, and are formed so that the lower face of the follower portion 158 which is the sheet 114 side is located at a position which is separated from the sheet 114, compared to a top face of the engaged portion 157 which is the side opposite to the sheet 114.

In addition, a moving unit 160 which relatively moves the recording unit 118 with respect to the recording face 114P (printing face) which is at least one face of the front face and the rear face of the sheet 114 is provided on a side of the recording unit 118 on which the engaged portion 157 and the follower portion 158 are formed, by moving the recording unit 118 through the follower portion 158.

That is, as illustrated in FIG. 14, the moving unit 160 includes an adjusting motor 161 which can perform a bidirectional rotation of a normal rotation and a reversal rotation, a transmission mechanism 162 for transmitting a driving force of the adjusting motor 161, and a rotating shaft 163 which can perform a bidirectional rotation of a normal rotation and a reversal rotation due to a driving force which is transmitted to the transmission mechanism 162. The rotating shaft 163 is provided so as to be extended along the width direction X, and a plurality of (two in the embodiment) cams 165 are provided in the rotating shaft 163 with an interval in the width direction X so as to correspond to each follower portion 158.

As illustrated in FIGS. 13 and 14, the cam 165 is formed in an approximate disk shape, and is set to an eccentric cam into which the rotating shaft 163 is inserted at a position different from a center. In addition, the cam 165 moves the recording unit 118 along the movement direction A through the follower portion 158, by rotating along with the rotating shaft 163 while being in contact with the follower portion 158 as a cam follower. That is, the cam 165 adjusts a position of the recording unit 118 in the movement direction A, by moving the recording unit 118 to the higher part along the movement direction A so as to be separated from the sheet 114 (support table 117), or moving the recording unit to the lower side along the movement direction A so as to be close to the sheet 114.

In addition, at least one engaging unit 166 which can be engaged with the engaged portion 157 of the recording unit 118, by rotating along with the rotating shaft 163 is provided in the rotating shaft 163 so as to correspond to the engaged portion 157. That is, according to the embodiment, two engaging units 166 are provided with an interval in the width direction X.

The engaging unit 166 is configured of a base end portion 167 which is supported by the rotating shaft 163, and a hook unit 168 which is formed in a shape which is bent with respect to the base end portion 167. In addition, in the engaging unit 166, a thickness at a tip end of the hook unit 168 is set to be larger than those in other portions. In addition, a distance (inner diameter) from a center of the rotating shaft 163 to an inner face of the hook unit 168 which is engaged with the engaged portion 157 is set to the same dimension as the outer dimension of the cam 165 in the same direction as the distance (inner diameter).

According to the embodiment, the engaged portion 157 and the rotating shaft 163 are provided in line along the movement direction A. That is, the engaged portion 157 is formed so as to be extended onto the rotating shaft 163, and the rotating shaft 163 is located between the engaged portion 157 and the transport path 113. For this reason, when the adjusting motor 161 performs normal driving from the state illustrated in FIG. 13, the engaging unit 166 performs a normal rotation (counterclockwise rotation in FIG. 13) along with a rotation of the rotating shaft 163. In addition, as illustrated in FIG. 14, the rotating shaft 163, the engaged portion 157, and the hook unit 168 of the engaging unit 166 align along the movement direction A. Accordingly, in the movement direction A, the engaging unit 166 can engage with the engaged portion 157 in a direction which is opposite to a side on which the sheet 114 (support table 117) is located (higher side in FIG. 13).

According to the embodiment, at least one bearing among bearings which rotatably support both sides of the rotating shaft 163 is set so as to move along the movement direction A of the recording unit 118. That is, as illustrated in FIG. 14, a bearing movement mechanism in which the bearing 169 on one end side (−X side) in the width direction X moves along the movement direction A due to a rotation of an adjusting screw 169A is configured.

The bearing 169 on one end side vertically moves in the movement direction A by rotating the adjusting screw 169A, and one end side of the rotating shaft 163 which is pivotally supported by the bearing 169 on one end side is vertically moved with respect to the other end side, relatively, using the bearing movement mechanism which is configured in this manner. The cam 165 on one end side vertically moves along the movement direction A on one end side of the recording unit 118 through the follower portion 158 along with the vertical movement of the rotating shaft 163 on one end side. In this manner, the recording unit 118 is adjusted so as to be parallel to the sheet 114 (support table 117) in the width direction X.

As illustrated in FIG. 13, the liquid ejecting head 170 in which a plurality of (only one is illustrated in FIG. 13) nozzles N which eject ink are formed is provided on the lower face of the recording unit 118 which is the support table 117 side. In addition, the printer 111 includes the cap 172 which can close a space in which nozzles N are present by being in contact with the recording unit 118 from the lower face side which is the support table 117 side, and a switching mechanism 171 which switches the cap 172 and the support table 117 by causing the cap and the support table to relatively move with respect to the recording unit 118.

The cap 172 includes a rectangular box-shaped cap holder 173 with a base of which a higher end which is the recording unit 118 side is open, and a box-shaped cap forming member 173A with a base which is arranged through at least one spring in the inside of the cap holder 173. In the cap holder 173, an extension unit of one end side 174 which is extended upward along the movement direction A and an extension unit of the other end side 175 are respectively formed at both sides in the width direction X thereof, a hole portion of one end side 174A is provided in the extension unit of one end side 174, and a hole portion of the other end side 175A is provided in the extension unit of the other end side 175 (refer to FIG. 16).

The switching mechanism 171 includes a moving motor M which can perform a bidirectional rotation of a normal rotation and a reversal rotation, a screw shaft 176 which rotates in both directions of a normal direction and a reversal direction along with the rotation of the moving motor M, and a cap side slider 178 and a support table side slider 179 which are screwed to the screw shaft 176. In addition, the cap side slider 178 is connected to the cap 172 using a first outside ring member 181*a* and a first inside ring member 181*b* which are provided as a pair. In addition, the support table side slider 179 is connected to the support table 117 using a second outside ring member 182*a* and a second inside ring member 182*b* which are provided as a pair.

In a wall member 183, a cap side guide rail 184 and a support table side guide rail 185 are formed as elongated holes which are provided so as to form a linear portion and a gentle S-shaped curved portion. In addition, the cap side guide rail 184 and the support table side guide rail 185 are formed so as to be line symmetric with respect to a reference line (not illustrated) which is extended in the movement direction A based on a position in which the recording unit 118 is provided in the transport direction Y. That is, in the cap side guide rail 184 and the support table side guide rail 185, each end portion on a center side which is the reference line side is located at the higher which is close to the recording unit 118 in the movement direction A, and each end portion on the outer side which is separated from the reference line is formed so as to be located on the lower side which is separated from the recording unit 118 in the movement direction A.

In addition, a cap side guide unit 186 which is provided in the first outside ring member 181*a* which is connected to the cap 172 is inserted into the cap side guide rail 184 so as to move along the cap side guide rail 184. Meanwhile, a support table side guide unit 187 which is provided in the second outside ring member 182*a* which is connected to the support table 117 is inserted into the support table side guide rail 185 so as to move along the support table side guide rail 185.

Figure 15:
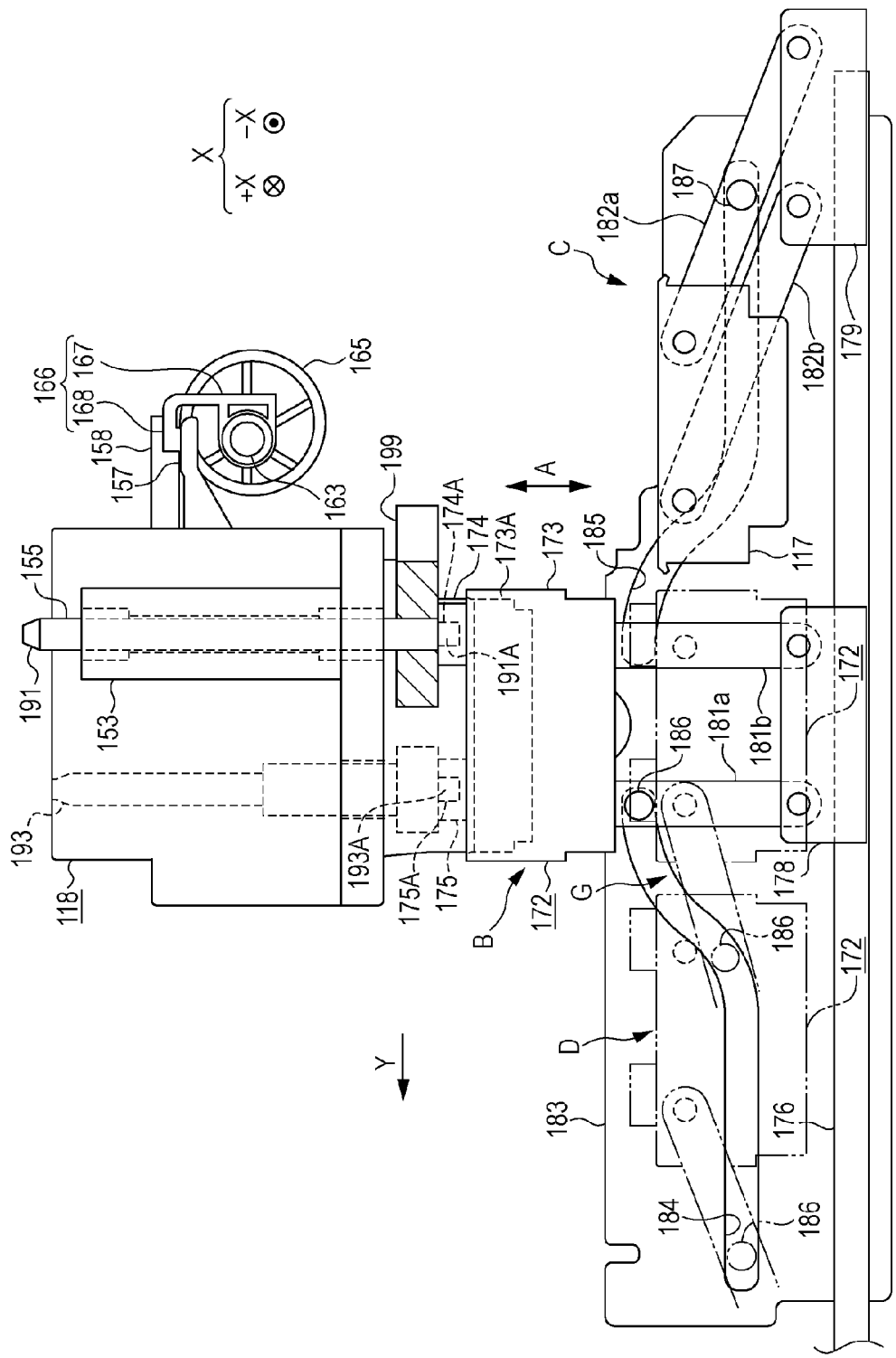
FIG. 15 is a schematic diagram which illustrates a state in which the cap covers a space in which the recording unit is present.
Figure 16:
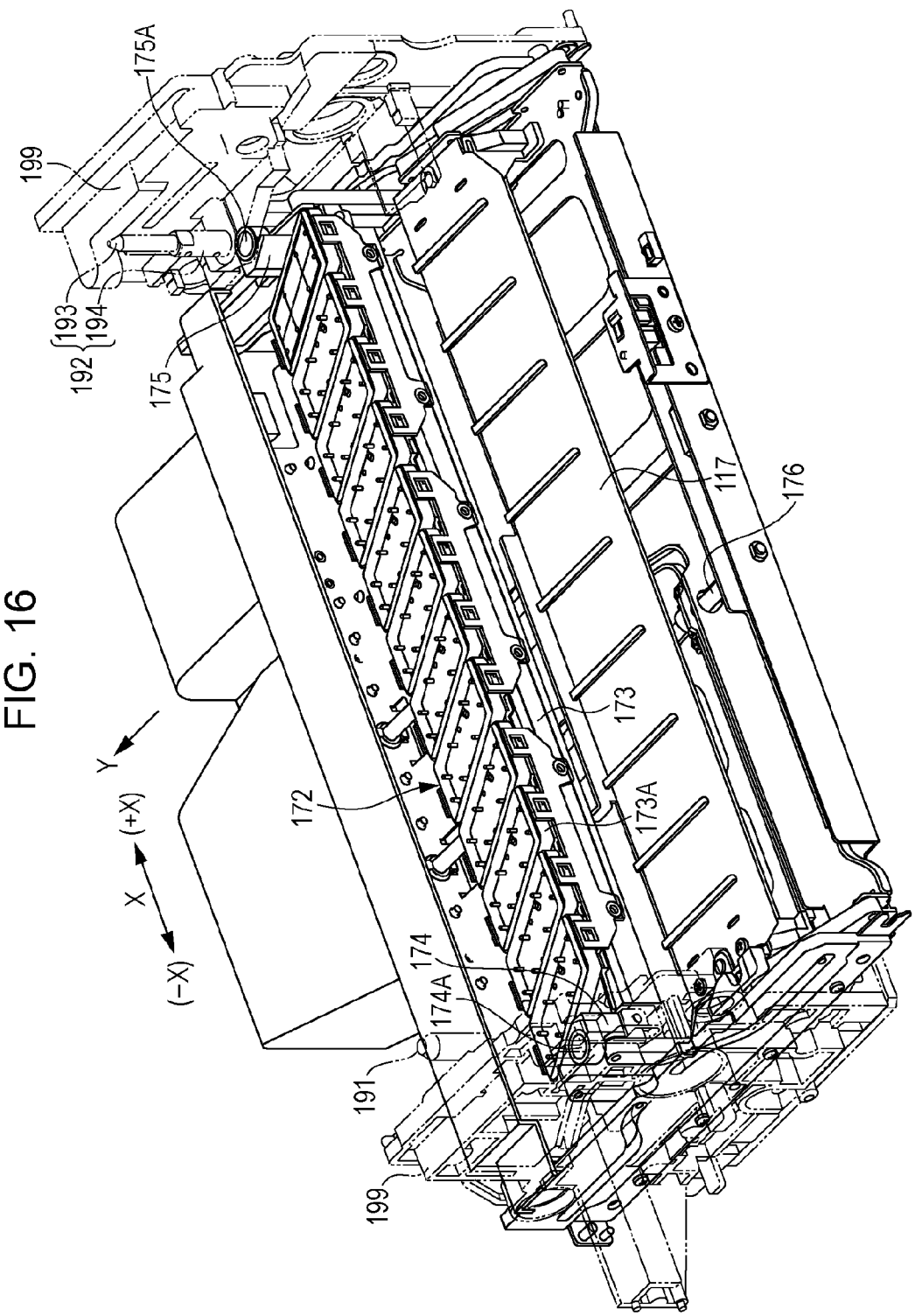
FIG. 16 is a perspective structural diagram which illustrates a structure in which the cap is positioned with respect to the recording unit.

As illustrated in FIGS. 15 and 16, in the cap 172, switching of a position of the support table 117 with respect to the recording unit 118 is performed due to an operation of the switching mechanism 171. That is, when the moving motor M performs a reverse driving in the state which is illustrated in FIG. 13, the cap side slider 178 and the support table side slider 179 move along the shaft direction of the screw shaft 176 so as to be separated from the moving motor M.

Then, as denoted by the two-dotted chain line in FIG. 15, first, the cap 172 which is located at a non-closing position D moves to an intermediate position G in a direction opposite to the transport direction Y along the transport direction Y, when the cap side guide unit 186 moves along the linear portion of the cap side guide rail 184. Subsequently, when the cap side guide unit 186 moves along the curved portion of the cap side guide rail 184, the cap 172 rises along the movement direction A from the intermediate position G, and moves to a closing position B which comes into contact with the lower face side of the recording unit 118. At this time, the support table 117 which is located at a support position E in FIG. 13 moves to a non-supporting position C in FIG. 15 in advance of a movement of the cap 172 to the intermediate position G due to a movement of the support table side slider 179.

When the moving motor M performs normal driving in this state, the cap side slider 178 and the support table side slider 179 move along the shaft direction of the screw shaft 176 so as to be close to the moving motor M along with a rotation of the moving motor M. Then, as illustrated in FIG. 13, the cap 172 moves so as to be separated from the recording unit 118, and moves to the non-closing position D which is different from the closing position B through the intermediate position G. Meanwhile, the support table 117 moves so as to be close to the recording unit 118, and moves to the support position E which supports the sheet 114. Accordingly, the switching mechanism 171 moves the cap 172 between the closing position B and the non-closing position D, and moves the support table 117 between the non-supporting position C and the support position E.

Figure 17:
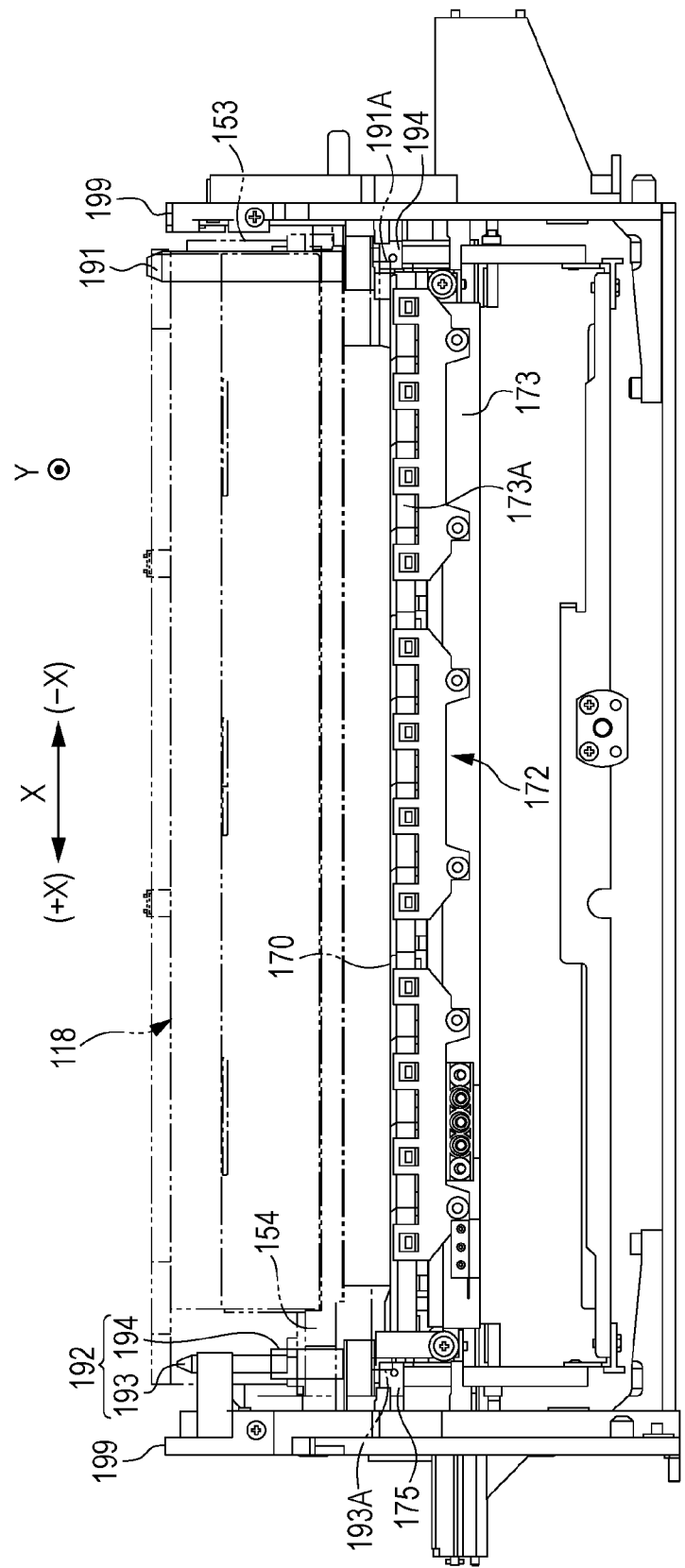
FIG. 17 is a side view which illustrates a state in which the cap is positioned with respect to the recording unit.

As illustrated in FIGS. 15, 16, and 17, according to the embodiment, the cap 172 is positioned with respect to the recording unit 118 when performing an upward movement along the movement direction A toward the closing position B from the intermediate position G. That is, a shaft protruding unit of one end side 191A of an insertion shaft of one end side 191 which is fixed to the base stand unit 199 is inserted into a hole portion of one end side 174A which is provided at an extension unit of one end side 174 of the cap 172, and a shaft protruding unit of the other end side 193A which is provided in an insertion shaft of the other end side 192 is inserted into a hole portion of the other end side 175A which is provided in an extension unit of the other end side 175 of the cap 172. As a result, the cap 172 is positioned in the transport direction Y and the width direction X using the insertion shaft of one end side 191 and the insertion shaft of the other end side 192 (in detail, the fixed shaft of the other end side 193) which are fixed to the base stand unit 199.

Meanwhile, as illustrated in FIGS. 17 and 18, the recording unit 118 is positioned using the insertion shaft of one end side 191 and the insertion shaft of the other end side 192 (in detail, eccentric cylindrical member 194). That is, as illustrated by being enlarged in a rectangular region which is denoted by a mark S1 in FIG. 18, a difference between the external dimension H1 of the first through hole 151A on one end side of the recording unit 118 and the external dimension J1 of the insertion shaft of one end side 191 which is located in the first through hole 151A is set to a minimum difference in dimension which is caused by a manufacturing error, for example. As a result, movements of one end side of the recording unit 118 in both directions of the transport direction Y and the width direction X are suppressed using the insertion shaft of one end side 191 which is inserted into the first through hole 151A of the first bush 155, and the one end side of the recording unit is positioned.

As illustrated in the rectangular region which is denoted by a mark S2 by being enlarged in FIG. 18, a difference between the dimension H2 between parallel edge portions of the through hole of the other end side 152 of the recording unit 118 and the external dimension J2 of the eccentric cylindrical member 194 which is located in the through hole of the other end side 152 is set to a minimum difference in dimension which is caused by a manufacturing error, for example. As a result, a movement of the other end side of the recording unit 118 in the transport direction Y is suppressed using the eccentric cylindrical member 194 of the insertion shaft of the other end side 192 which is inserted into the through hole of the other end side 152, and the one end side of the recording unit is positioned.

As illustrated in the region which is denoted by the mark S3 by being enlarged in FIG. 18, in the second through hole 151B on one end side of the recording unit 118, similarly to the through hole of the other end side 152, a difference between the dimension H3 between the parallel edge portions and the external dimension J3 of the insertion shaft of one end side 191 which is located in the second through hole 151B is set to a minimum difference in dimension which is caused by a manufacturing error, for example. As a result, a movement of the one end side of the recording unit 118 in the transport direction Y is suppressed also using the insertion shaft of one end side 191 which is inserted into the second through hole 151B of the second bush 156. For this reason, a movement of the recording unit 118 to the transport direction Y is suppressed in the first through hole 151A, the second through hole 151B, and the through hole of the other end side 152 which respectively are arranged at three positions which are different when viewed from the transport direction Y, and a rotation (inclination) around the shaft line which goes along the width direction X is suppressed.

Accordingly, as illustrated in FIG. 17, the recording unit 118 is positioned using the insertion shaft of one end side 191 and the insertion shaft of the other end side 192 which are fixed to the base stand unit 199 in both directions of the transport direction Y and the width direction X, and the cap 172 is positioned using the insertion shaft of one end side 191 and the insertion shaft of the other end side 192 which are fixed to the base stand unit 199. In other words, the cap 172 is positioned with respect to the recording unit 118 through the insertion shaft of one end side 191 and the insertion shaft of the other end side 192 which are fixed to the base stand unit 199. When the cap 172 is positioned with respect to the recording unit 118 in this manner, the cap 172 comes into contact with the liquid ejecting head 170 which is provided on the lower face of the recording unit 118 in an appropriate state in which a positional deviation is suppressed in the closing position B, and cover a space in which the recording unit 118 is present.

When the cap 172 is located at the closing position B, the recording unit 118 is pressed from the lower part along the movement direction A using the box-shaped cap forming member 173A with a base which is arranged through at least one spring (not illustrated) in the cap holder 173. Therefore, according to the embodiment, as illustrated in FIG. 15, the rotating shaft 163, the engaged portion 157, and hook unit 168 of the engaging unit 166 are caused to be aligned, by causing the engaging unit 166 to perform a normal rotation along with a rotation of the rotating shaft 163. By doing so, the engaging unit 166 engages with the engaged portion 157 in a direction opposite to the side on which the sheet 114 (support table 117) is located. Due to the engagement with the engaged portion 157 from the higher part of the engaging unit 166, a movement of the recording unit 118 to the higher part in the movement direction A is suppressed when the recording unit 118 is pressed from the lower side on the sheet 114 side, using the cap forming member 173A.

As illustrated in FIG. 18, in the liquid ejecting head 170 which is included in the recording unit 118 is configured by including a plurality of (six, here) individual heads of which both ends in the longitudinal direction thereof (width direction X) are set so as to have an external shape which is an approximate parallelogram with an oblique side which is inclined in a direction orthogonal to the longitudinal direction, and are provided side by side along the longitudinal direction of the recording unit 118. In the liquid ejecting head 170, a plurality of nozzle columns NR in which a plurality of nozzles N are arranged in line in parallel to an oblique side 170R of a parallelogram of the liquid ejecting head 170 are provided in line with a predetermined interval in the longitudinal direction of the recording unit 118. Accordingly, the cap 172 is configured so that the cap forming member 173A in the cap holder 173 is formed as a plurality of box-shaped individual caps with bases of which external shapes are approximate parallelograms, according to the liquid ejecting head 170 which is set to the approximate parallelogram, and a plurality of individual caps come into contact with the liquid ejecting head 170 which is configured by including a plurality of individual heads (refer to FIG. 16).

As illustrated in FIG. 18, the recording unit 118 has an external shape which is approximate rectangular shape when viewed from the movement direction A, and the liquid ejecting head 170 which is set to an approximate parallelogram is provided in the rectangular shape. For this reason, approximately triangular regions R in which the liquid ejecting head 170 is not provided are respectively formed at both ends of the flat plate unit 154 in the longitudinal direction in the recording unit 118, at positions which are deviated from each other in the transverse direction (transport direction Y) which is orthogonal to the longitudinal direction. Therefore, according to the embodiment, in the approximately triangular regions R at both ends in the longitudinal direction, the through hole of one end side 151 is formed at one side, and the through hole of the other end side 152 is formed on the other side, respectively. By doing so, the through hole of one end side 151 and the through hole of the other end side 152 are arranged so as to overlap with the liquid ejecting heads 170 (individual heads) which are closest to one end portion side and the other end portion side in the longitudinal direction of the recording unit 118 among the liquid ejecting heads 170, in the transport direction Y of the recording unit 118. As a result, it is possible to form a through hole for positioning the recording unit 118 without making the external shape of the recording unit 118 large by stretching the shape in the longitudinal direction or the transverse direction, and it is possible to prevent an external size of the printer 111 from increasing by saving a space for arranging a mechanism for performing an inclination correction of the recording unit 118.

Figure 19:
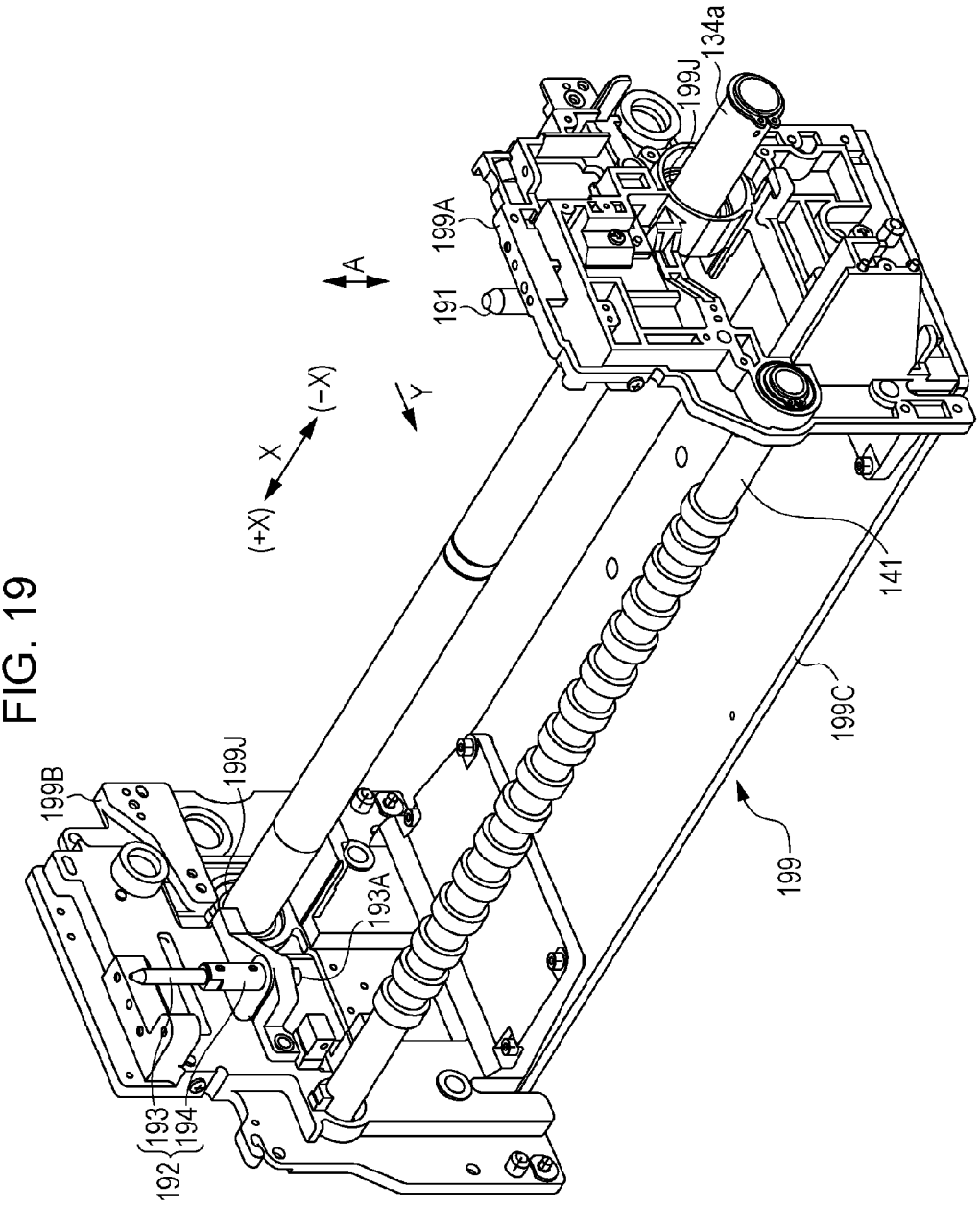
FIG. 19 is a perspective view which illustrates a configuration of a base stand unit on which a transport unit of a medium, and an insertion shaft which positions the recording unit, are provided.

As illustrated in FIG. 19, the base stand unit 199 according to the embodiment includes a base stand of one end side 199A to which the insertion shaft of one end side 191 is fixed, a base stand of the other end side 199B to which the insertion shaft of the other end side 192 is fixed, and a connection base stand 199C which connects the base stand of one end side 199A and the base stand of the other end side 199B, and is formed in a U shape when viewed in the transport direction Y. In addition, the base stand of one end side 199A and the base stand of the other end side 199B are formed using an injection molding process of a metal material (for example, aluminum die cast), and the base stand unit 199 has a high rigidity in which, for example, bending or twisting deformation rarely occurs.

A bearing unit 199J in which the driving roller 134a of the fourth pair of supply rollers 134 as the transport unit 115 which transports the sheet 114 to the recording unit 118 is pivotally supported in a rotating manner is provided in the base stand unit 199. Accordingly, a relative position of the insertion shaft of one end side 191 and the insertion shaft of the other end side 192 (in detail, the fixed shaft of the other end side fixed shaft 193) which are fixed to the base stand unit 199 is stably maintained without being changed with respect to the sheet 114 which is transported in the transport direction Y using the driving roller 134a which is pivotally supported by the bearing unit 199J of the base stand unit 199 with a high rigidity. In addition, according to the embodiment, it is configured so that a bearing unit which pivotally support the driving roller of the first pair of transport rollers 141 which is located on the immediately downstream side in the transport direction Y with respect to the recording unit 118 is also provided in the base stand unit 199, a positional deviation between two driving rollers which are located in front and behind of the recording unit 118 is suppressed, and the sheet 114 is stably transported in the transport direction Y.

Therefore, according to the embodiment, it is possible to adjust a position of the recording unit 118 with respect to the sheet 114 which is transported using the driving roller 134a of the fourth pair of supply rollers 134, specifically, an inclination of the recording unit 118 in the longitudinal direction from the width direction X which is orthogonal to the transport direction Y of the sheet 114, using the insertion shaft of one end side 191 and the insertion shaft of the other end side 192 which are fixed to the base stand unit 199. That is, the insertion shaft of one end side 191 and the insertion shaft of the other end side 192 as guiding shafts when moving the recording unit 118 along the movement direction A with respect to the recording face 114P of the sheet 114 using the moving unit 160 are used as shafts for adjusting an inclination of the recording unit 118 in the longitudinal direction with respect to the width direction X.

Subsequently, operations in the embodiment, that is, operations for adjusting an inclination of the recording unit 118 in the width direction X will be described. In the following description, first, the eccentric cylindrical member 194 of the insertion shaft of the other end side 192 will be described, and the operations for adjusting an inclination of the recording unit 118 will be described thereafter.

Figure 20A:
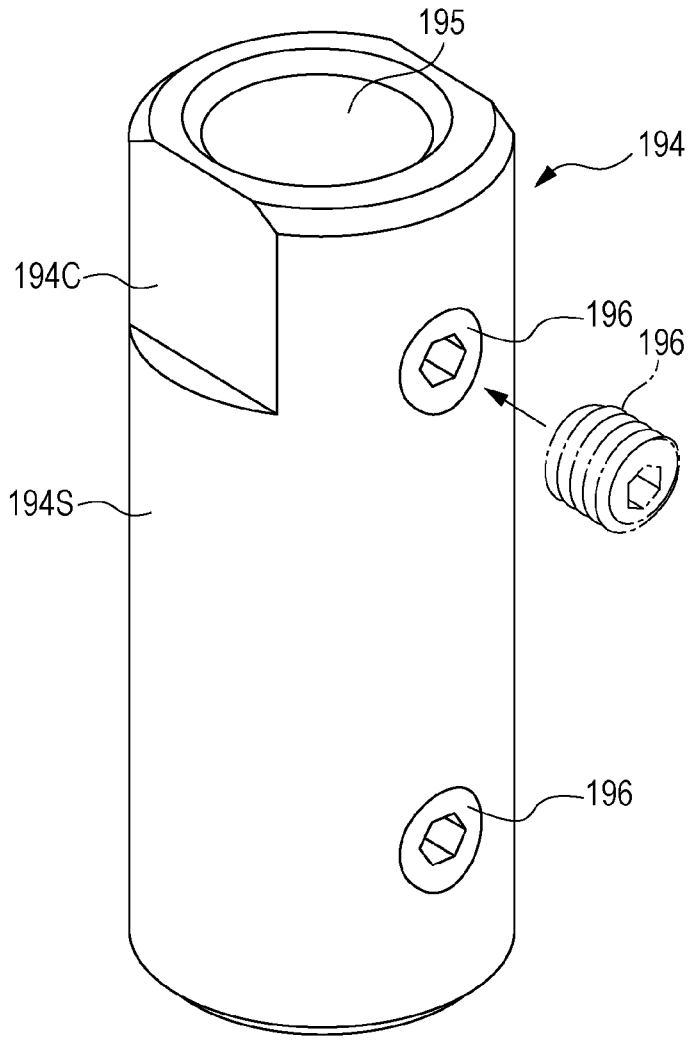
FIG. 20A is a perspective view of an eccentric cylindrical member.
Figure 20B:
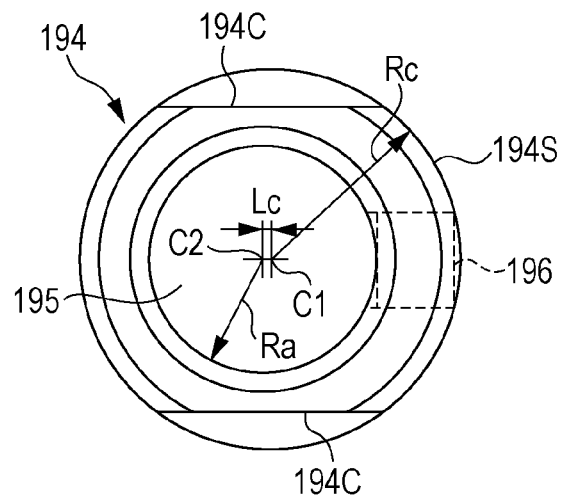
FIG. 20B is a plan view in which the eccentric cylindrical member is viewed from a shaft line direction of a center shaft of a cylindrical face.

As illustrated in FIGS. 20A and 20B, the eccentric cylindrical member 194 includes a circular hole portion 195 with a radius Ra which has a center shaft C2 of which a shaft line is deviated by a predetermined dimension Lc from a center shaft C1 of a cylindrical face 194S with a radius Rc which is included as an outer face, and the fixed shaft of the other end side 193 is inserted into the hole portion 195. In addition, a fixing screw 196 such as a so-called "set screw", for example, is attached to two portions of the cylindrical face 194S in the shaft line direction of the center shaft C1 as a fixing member.

According to the embodiment, the fixing screw 196 is attached to a position opposite to a position of the shaft line of the center shaft C2 of the hole portion 195 to which the fixed shaft of the other end side 193 is inserted with respect to the shaft line of the center shaft C1 of the cylindrical face 194S of the eccentric cylindrical member 194. As a result, in the eccentric cylindrical member 194, the fixing screw 196 is attached to a position in which a thickness of the member in a section which is cut on a face intersecting the shaft line of the center shaft C1 of the cylindrical face 194S is a maximum. In addition, the fixing screw 196 fastens the fixed shaft of the other end side 193 which is inserted into the hole portion 195 in the hole portion 195 so as to be separated from the shaft line of the center shaft C1 of the cylindrical face 194S by being attached to the eccentric cylindrical member 194 in a rotating manner.

Accordingly, even when a gap occurs between the fixed shaft of the other end side 193 which is inserted into the hole portion 195 and the hole portion 195, the gap causes an amount of deviation of the center shaft C1 of the cylindrical face 194S of the eccentric cylindrical member 194 with respect to the center shaft of the other end side 193 to be increased, when the fixing screw 196 which is attached to the eccentric cylindrical member 194 fastens the fixed shaft of the other end side 193. That is, fastening of the fixing screw 196 functions so as to make an eccentric amount of the eccentric cylindrical member 194 with respect to the fixed shaft of the other end side 193 to be increased.

According to the embodiment, the eccentric cylindrical member 194 is fixed in a state in which a rotation of the cylindrical face 194S with respect to the fixed shaft of the other end side 193 is restrained, when the fixing screw 196 is rotated in a state in which the fixed shaft of the other end side 193 is inserted into the hole portion 195 of the eccentric cylindrical member 194, and the fixed shaft of the other end side 193 is fastened to the hole portion 195. That is, according to the embodiment, the eccentric cylindrical member 194 is attached to the fixed shaft of the other end side 193 using the fixing screw 196 in a state in which a rotation torque around the fixed shaft of the other end side 193 is set to a predetermined torque value or more, and a rotation thereof is restrained.

Accordingly, it is possible to forcibly rotate the eccentric cylindrical member 194 around the fixed shaft of the other end side 193 using a rotation torque of which a value is a predetermined torque value, and the eccentric cylindrical member 194 is maintained at a state in which a rotation is restrained, that is, a state in which the eccentric cylindrical member 194 does not easily rotate with respect to the fixed shaft of the other end side 193 in a state in which the rotation is stopped. In other words, the fixing screw 196 attaches the eccentric cylindrical member 194 to the fixed shaft of the other end side 193 so that, even when the eccentric cylindrical member 194 is forcibly rotated with respect to the fixed shaft of the other end side 193, a state in which a rotation is restrained is to be maintained after the rotation.

According to the embodiment, since the eccentric cylindrical member 194 is rotated in a state in which the eccentric cylindrical member 194 is attached to the fixed shaft of the other end side 193, in the eccentric cylindrical member 194, at least one cut face 194C which is parallel to the shaft line of the center shaft C1 of the cylindrical face 194S is provided at at least a part of the cylindrical face 194S. Specifically, in the cylindrical face 194S, a pair of the cut face 194C is provided at both sides on which the fixing screw 196 is interposed therebetween, and which are the higher side end portion in the movement direction A so as to be parallel to each other. Accordingly, it is possible to forcibly rotate the eccentric cylindrical member 194 by gripping the cut face 194C using a tool such as a wrench, and adjusting of inclination of the recording unit 118 is performed by forcibly rotating the eccentric cylindrical member 194.

Figure 21A:
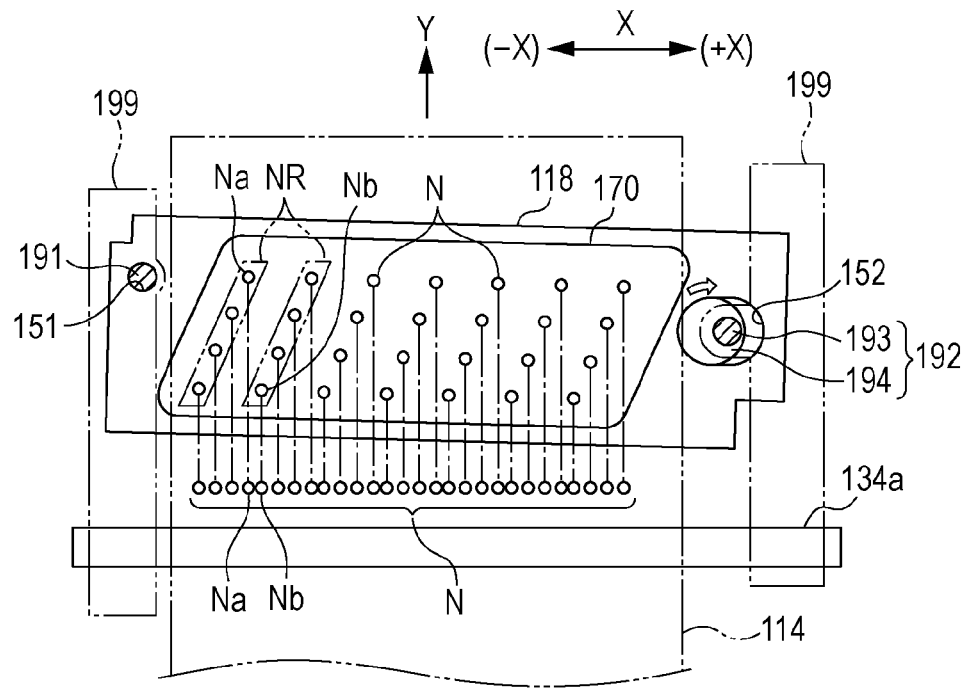
FIG. 21A is an explanatory diagram which schematically illustrates an adjusting operation in which an inclination of the recording unit is adjusted.
Figure 21B:
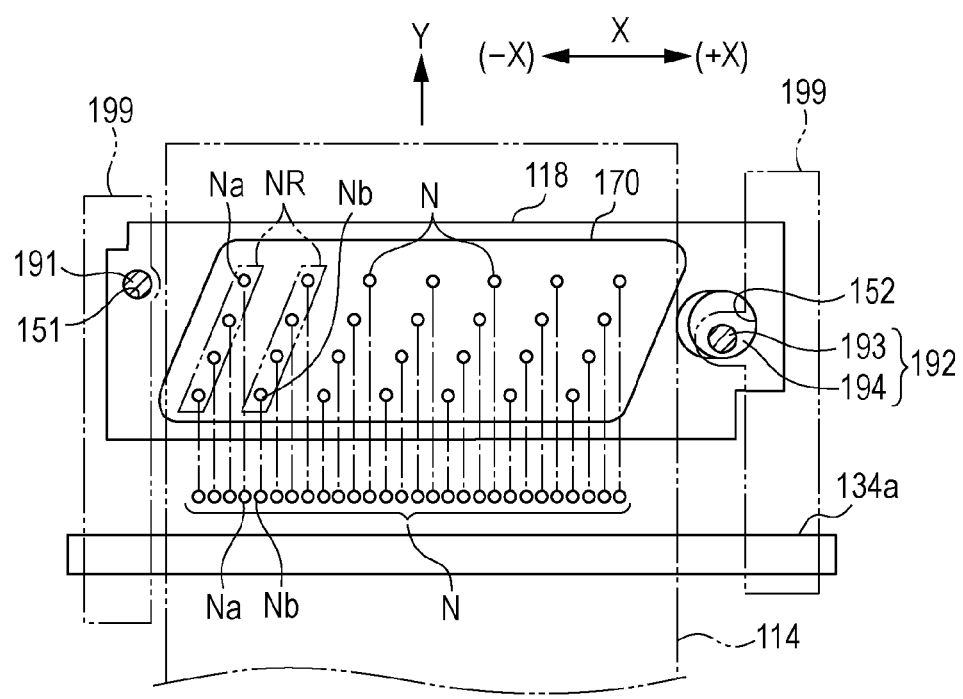
FIG. 21B is an explanatory diagram which schematically illustrates an adjusting operation in which an inclination of the recording unit is adjusted.

Subsequently, adjusting of inclination of the recording unit 118 will be described with reference to FIGS. 21A and 21B. In FIGS. 21A and 21B, for ease of descriptions, each constituent element with a mark is schematically illustrated.

As illustrated in FIG. 21A, a case is assumed in which the recording unit 118 is in an inclined state in which the other end side (+X side) is located on the upstream side in the transport direction Y with respect to one end side (−X side) in the width direction X which intersects (orthogonal, here) the transport direction Y of the sheet 114 which is transported using the driving roller 134a. In such a case, a state in which intervals of the nozzles N which are formed in the liquid ejecting head 170 in the width direction X become uneven occurs.

That is, an interval of each nozzle N in the width direction X which is viewed in the transport direction Y is uneven, and for example, as denoted by the nozzles Na and Nb in FIG. 21A, an interval between two nozzles N between the nozzle columns NR becomes narrower than an interval between nozzles N in the nozzle column NR. Alternatively, though it is not illustrated here, when the recording unit 118 is in an inclined state in which the other end side (+X side) is located on the downstream side in the transport direction Y with respect to one end side (−X side) in the width direction X, an interval between two nozzles N which are located between the nozzle columns NR becomes wider than an interval between nozzles N in the nozzle column NR. For this reason, for example, there is a concern that black stripes (or white stripes), or the like, may occur in an image which is recorded on the sheet 114 using the recording unit 118, and a recording quality may deteriorate.

Therefore, as illustrated in FIG. 21B, an inclination correction of the recording unit 118 is performed so that the longitudinal direction of the recording unit 118 is set to the width direction X which is orthogonal to the transport direction Y of the sheet 114 which is transported using the driving roller 134a.

That is, in the insertion shaft of the other end side 192 which is inserted into the through hole of the other end side 152, the eccentric cylindrical member 194 is rotated with respect to the fixed shaft of the other end side 193. As an example, the eccentric cylindrical member 194 is rotated in clockwise when viewed from the surface side of a paper face as denoted by an outline arrow from a position which is denoted using hatching in FIG. 21A. Due to the rotation, the eccentric cylindrical member 194 moves to a position denoted hatching in FIG. 21B, and the other end side (+X side) of the recording unit 118 is moved to the downstream side in the transport direction Y by an eccentric amount from the center shaft of the fixed shaft of the other end side 193 at the most, by setting the fixed shaft of the other end side 193 as a reference.

At this time, the one end side (−X side) of the recording unit 118 is positioned in both directions of the transport direction Y and the width direction X using the insertion shaft of one end side 191 which is inserted into the through hole of one end side 151. For this reason, the recording unit 118 rotates (oscillates) using the insertion shaft of one end side 191 as a center shaft of a rotation (reference shaft). Accordingly, it is possible to adjust a movement amount of the other end side (+X side) of the recording unit 118 along the transport direction Y by adjusting the rotation amount of the eccentric cylindrical member 194. The recording unit 118 rotates (oscillates) around the insertion shaft of one end side 191, and an inclination of the recording unit 118 in the longitudinal direction with respect to the width direction X which is orthogonal to the transport direction Y of the sheet 114 is adjusted.

In this manner, since it is possible to adjust an inclination of the recording unit 118 in the longitudinal direction, it is not necessary to adopt a configuration in which the eccentric cylindrical member 194 is caused to come into contact with the outer edge of the recording unit 118, and it is possible to save a space for arranging the eccentric cylindrical member 194. In addition, when the longitudinal direction of the recording unit 118 matches the width direction X which is orthogonal to the transport direction Y, intervals of nozzles N which are formed in the liquid ejecting head 170 in the width direction X become even. For example, as denoted by the nozzles Na and Nb in FIG. 21B, in each interval of each nozzle N in the width direction X which is viewed in the transport direction Y, an interval between two nozzles N which are located between nozzle columns NR, and an interval between each of nozzles N in the nozzle column NR become same. For this reason, for example, in an image which is recorded on the sheet 114 using the recording unit 118, it is possible to suppress an occurrence of a white stripe, a black stripe, or the like.

In a state in which an inclination of the recording unit 118 is adjusted so that intervals between nozzles N which are formed in the liquid ejecting head 170 become even in the width direction X, it is not a problem even if the longitudinal direction of the recording unit 118 does not necessarily match the width direction X which is orthogonal to the transport direction Y.

As another operation in the embodiment, there is a moving operation in which the recording unit 118 is smoothly moved, when being in a state in which a distance (gap) between the recording face 114P of the sheet 114 which is transported on the support table 117 and the liquid ejecting head 170 of the recording unit 118 is even along the width direction X, that is, when the recording unit 118 is adjusted to a parallel state.

The moving operation will be described with reference to FIGS. 22A and 22B. In addition, in FIGS. 22A and 22B which are referred to here, for ease of descriptions, each constituent element with a mark is schematically illustrated.

Figure 22A:
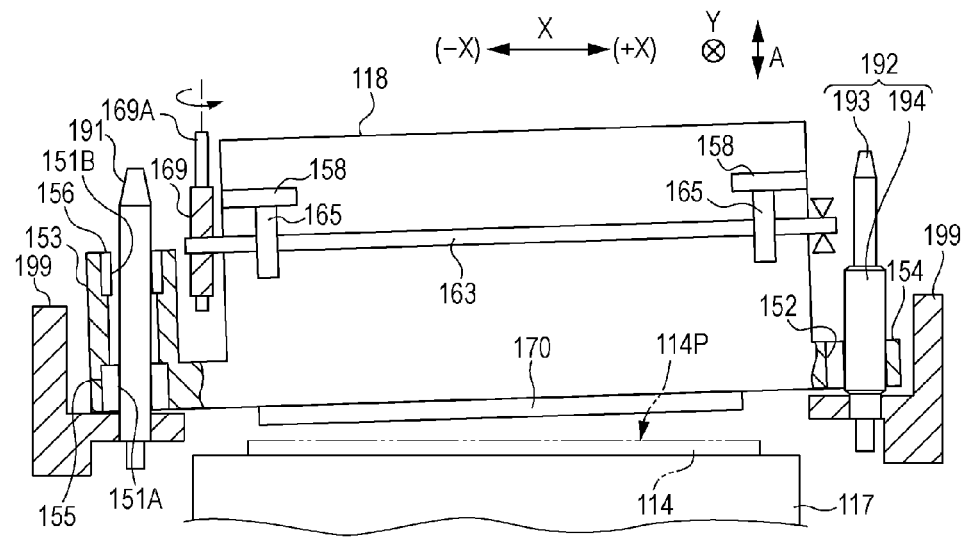
FIG. 22A is an explanatory diagram which schematically illustrates an adjusting operation in which the recording unit is adjusted so as to be parallel to the recording face of the medium.

As illustrated in FIG. 22A, a case is assumed in which the recording unit 118 is in an inclined state in which the one end side (-X side) is close to the recording face 114P side by being lowered compared to the other end side (+X side) in the width direction X which intersects (orthogonal) the transport direction Y with respect to the recording face 114P of the sheet 114 which is transport on the support table 117. In such a case, since ink (not illustrated) which is ejected from the liquid ejecting head 170 reaches the recording face 114P early on the one end side (-X side) compared to the other end side (+X side), there is a concern that distortion may occur in an image which is printed on the recording face 114P due to a time difference until the ink reaches the recording face 114P. Therefore, as illustrated in FIGS. 22A and 22B, the bearing 169 of one end side is raised with respect to the base stand unit 199 by turning the adjusting screw 169A on the one end side (-X side) of the recording unit 118, and one end side of the rotating shaft 163 which is pivotally supported by the bearing 169 on one end side is raised.

Figure 22B:
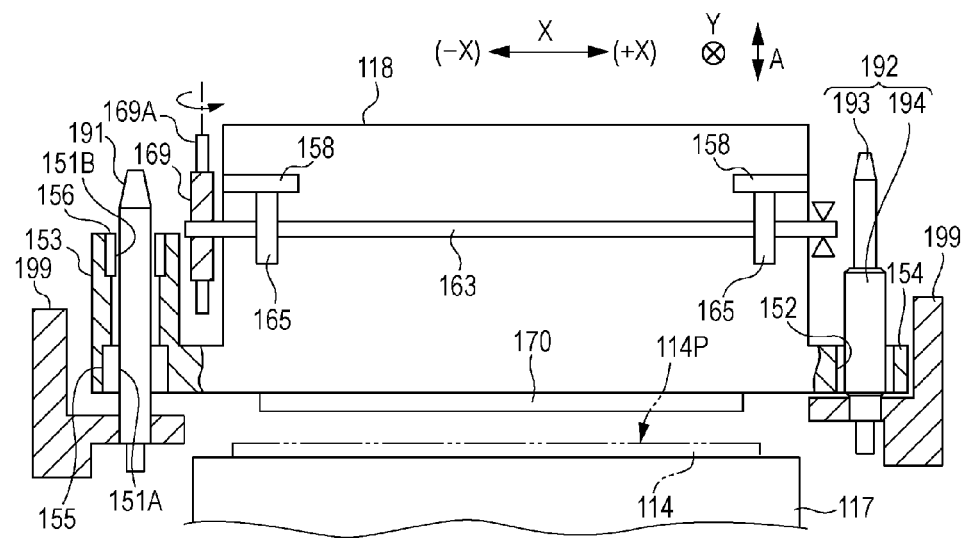
FIG. 22B is an explanatory diagram which schematically illustrates an adjusting operation in which the recording unit is adjusted so as to be parallel to the recording face of the medium.

As a result, as illustrated in FIG. 22B, the cam 165 on one end side which is provided in the rotating shaft 163 is moved upward along the movement direction A on one end side of the recording unit 118 through the follower portion 158 when the rotating shaft 163 is raised. The recording unit 118 is adjusted so as to be parallel to the sheet 114 (support table 117) in the width direction X when the one end side is raised.

At this time, the recording unit 118 moves to the higher part on one end side of the recording unit 118 in a state in which positions in both directions of the transport direction Y and the width direction X are positioned using the circular first through hole 151A of the first bush 155 which is provided in the cylindrical unit 153, and the insertion shaft of one end side 191 which is inserted into the first through hole with a small gap. For this reason, the recording unit 118 relatively rotates in clockwise, when viewed from the upstream side, in the transport direction Y around the first bush 155. Along with the rotation in clockwise of the recording unit 118 around the first bush 155, the second bush 156 which is provided in the cylindrical unit 153 moves toward a direction on the other end side (+X side) in the longitudinal direction of the recording unit 118, and the through hole of the other end side 152 which is provided on the flat plate unit 154 also moves toward a direction on the other end side (+X side) in the longitudinal direction of the recording unit 118.

At this time, since the second through hole 151B of the second bush 156 is set to a long circular hole with a parallel edge portion L3 which goes along the longitudinal direction (width direction X) of the recording unit 118, the second bush 156 smoothly moves without an occurrence of scooping out between the second through hole 151B and the insertion shaft of one end side 191 which is inserted into the second through hole 151B. In addition, since the through hole of the other end side 152 is also set to a long circular hole with a parallel edge portion L2 which goes along the longitudinal direction (width direction X) of the recording unit 118, the flat plate unit 154 of the recording unit 118 in which the through hole of the other end side 152 is provided smoothly moves without an occurrence of scooping out between the through hole of the other end side 152 and the insertion shaft of the other end side 192 which is inserted into the through hole of the other end side 152.

The length of the parallel edge portion which goes along the respective longitudinal directions (width direction X) of the second through hole 151B and the through hole of the other end side 152 is set to a length with which the recording unit 118 can be smoothly moved when being adjusted to an even state (parallel state) along the width direction X using the bearing movement mechanism.

According to the above described embodiments, it is possible to obtain the following effects.

(1) Since the through hole of one end side 151 and the through hole of the other end side 152 are respectively formed in approximately triangular regions R (refer to FIG. 18) on both sides of the recording unit 118 in the longitudinal direction, it is possible to arrange a mechanism which adjusts an inclination of the recording unit 118 in the longitudinal direction without making a shape of the recording unit large by extending the appearance of the recording unit 118 in the longitudinal direction or the transverse direction.

It is possible to correct an inclination of the recording unit 118 with respect to the width direction X which is orthogonal to the transport direction Y of the sheet 114 which is transported by the transport unit 115 without urging the recording unit 118 using an urging member, using a through hole, and an insertion shaft (for example, eccentric cylindrical member 194) which is inserted into the through hole. As a result, since abrasion of the through hole and the insertion shaft is suppressed, and it is possible to appropriately perform an inclination correction of the recording unit 118, deterioration in recording quality (for example, image quality) can be suppressed. In addition, it is possible to suppress deterioration in recording quality, since there is no vibration of the recording unit 118 which is caused by the urging member.

(2) Since it is possible to suppress a decreases in eccentric amount when fixing the eccentric cylindrical member 194 to the fixed shaft of the other end side 193 using the fixing screw 196, it is possible to appropriately perform an inclination correction of the recording unit 118.

(3) Since it is possible to easily determine a rotation position of the eccentric cylindrical member 194 with respect to the fixed shaft of the other end side 193 when fixing the eccentric cylindrical member 194 to the fixed shaft of the other end side 193 using the cut face 194C, it is possible to appropriately perform an inclination correction of the recording unit 118. In addition, it is possible to easily rotate the eccentric cylindrical member 194 around the fixed shaft of the other end side 193 using the cut face 194C.

(4) Since the insertion shaft of one end side 191 and the insertion shaft of the other end side 192 guides a movement of the recording unit 118 when the recording unit 118 is moved along the movement direction A, it is not necessary to separately provide a guiding shaft when the recording unit 118 is relatively moved with respect to the recording face 114P of the sheet 114. Accordingly, it is possible to prevent a structure of the printer 111 from being complicated.

(5) When the recording unit 118 is adjusted so as to be parallel to the recording face 114P of the sheet 114, even when movement amounts of the recording unit 118 toward the movement direction A are different at both end portions in the longitudinal direction, it is possible for the insertion shaft of one end side 191 to smoothly move without being scooped out in the second through hole 151B which is a long circular hole.

(6) Since a portion of the base stand unit 199 which is fixed to the insertion shaft of one end side 191 and the fixed shaft of the other end side 193, and a portion of the base stand unit 199 at which the bearing unit 199J is provided are integrated, it is possible to suppress a positional deviation of the insertion shaft of one end side 191 and the insertion shaft of the other end side 192 (the fixed shaft of the other end side 193) with respect to the transport direction Y of the sheet 114 using the driving roller 134a. Accordingly, it is possible to accurately adjust an inclination with respect to the width direction X which is orthogonal to the transport direction Y for the sheet 114 which is transported using the driving roller 134a.

(7) Since the insertion shaft of one end side 191 and the insertion shaft of the other end side 192 position the cap 172 with respect to the recording unit 118, it is not necessary to separately provide a positioning member with respect to the recording unit 118 when the cap 172 covers the recording unit 118. Accordingly, it is possible to prevent the structure of the printer 111 from being complicated.

In addition, the above described embodiment may be modified to different embodiments as follow.

In the above described embodiment, it is preferable that the insertion shaft of the other end side 192 positions the cap 172 with respect to the recording unit 118 using the eccentric cylindrical member 194 when the cap 172 covers the recording unit 118. A modification example of a positioning structure of the cap 172 will be described with reference to diagrams.

Figure 23A:
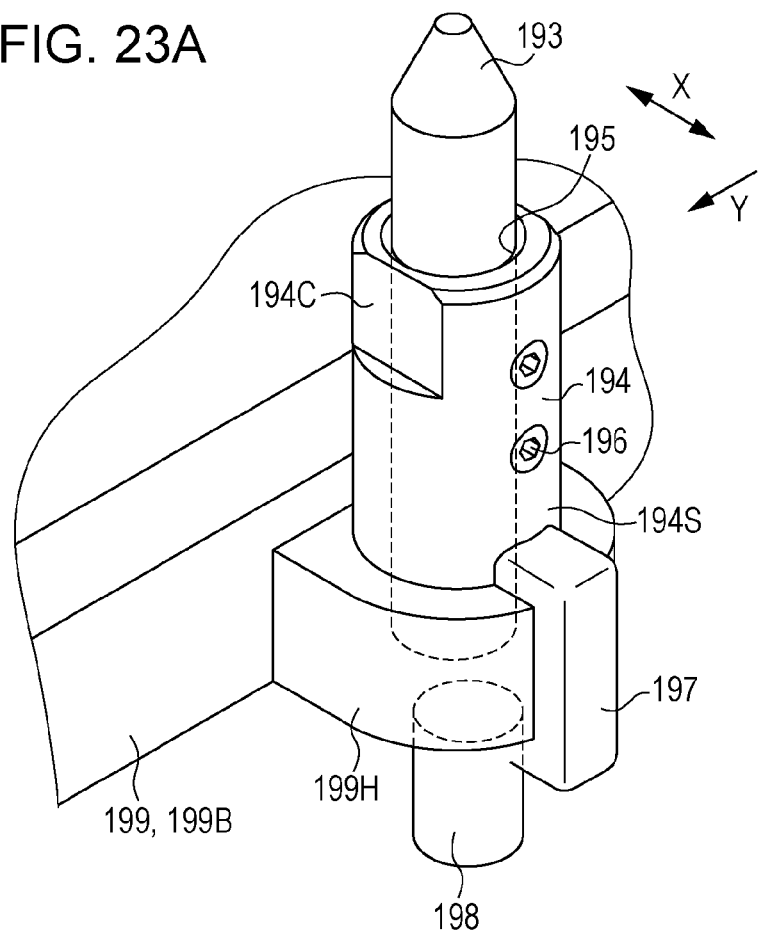
FIG. 23A is a perspective view which schematically illustrates a modification example of a positioning structure of the cap with respect to the recording unit.
Figure 23B:
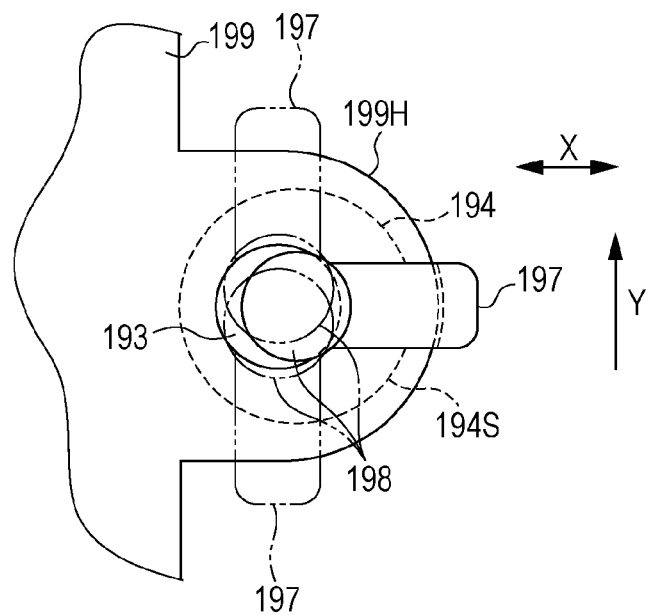
FIG. 23B is a plan view in which the positioning structure is viewed from below.

As illustrated in FIGS. 23A and 23B, the eccentric cylindrical member 194 in the modification example has the same center shaft as the center shaft of the cylindrical face 194S on the outer face, and the columnar member 198 which is provided so as to be located on the lower side which is the sheet 114 side of the base stand unit 199 is connected to the cylindrical face 194S of the eccentric cylindrical member 194 using an approximately C-shaped connection unit 197. In addition, the fixed shaft of the other end side 193 which is inserted into the hole portion 195 of the eccentric cylindrical member 194 is fixed to eaves 199H which are approximately circular, and are provided in the base stand unit 199 without providing the shaft protruding unit of the other end side 193A (refer to FIG. 13) in the above described embodiment.

As denoted by a two-dotted chain line in FIG. 23B, the connection unit 197 of the eccentric cylindrical member 194 is formed so as to rotate by approximately a semicircle along the outer periphery of the eaves 199H which are approximately half circular, and are provided in the base stand unit 199, when the eccentric cylindrical member 194 is rotated using the cut face 194C. As a result, the columnar member 198 which is connected to the connection unit 197 rotates around the fixed shaft of the other end side 193 along with the eccentric cylindrical member 194 when the eccentric cylindrical member 194 is rotated at a time of adjusting an inclination of the recording unit 118. As a result, the columnar member 198 moves in the transport direction Y as denoted by the two-dotted chain line in FIG. 23B.

Therefore, in the modification example, positioning of the cap 172 with respect to the recording unit 118 is performed using the columnar member 198 which has the same center shaft as the center shaft of the cylindrical face of the eccentric cylindrical member 194, instead of the shaft protruding unit of the other end side 193A. That is, when the columnar member 198 is inserted into the hole portion of the other end side 175A which is provided in the extension unit of the other end side 175 of the cap 172 at a time the cap 172 covers the recording unit 118, the cap 172 is positioned by being aligned with a center of the cylindrical face 194S of the eccentric cylindrical member 194 after a rotation with respect to the recording unit 118 of which an inclination in the transport direction Y is adjusted, due to the rotation of the eccentric cylindrical member 194.

In addition, the columnar member 198 moves in the transport direction Y, and moves also in the width direction X as denoted by the two-dotted chain line in FIG. 23B. Accordingly, it is preferable that the hole portion of the other end side 175A into which the columnar member 198 is inserted, and which is provided in the extension unit of the other end side 175 is set to an elongated hole with a linear parallel edge portion which goes along the longitudinal direction (width direction X) of the cap 172, similarly to the through hole of other end side 152.

According to the modification example, it is possible to obtain the following effects, in addition to the effects (1) to (7) in the above described embodiment.

(8) Since it is possible to perform positioning with respect to the recording unit 118 when the cap 172 covers the recording unit 118 according to a position of the recording unit 118 of which an inclination is adjusted, the cap 172 can cover the recording unit 118 in a state in which a positional deviation with respect to the recording unit 118 is suppressed.

In the above described embodiment, the insertion shaft of one end side 191 and the insertion shaft of the other end side 192 may not necessarily position the cap 172 with respect to the recording unit 118 when the cap 172 covers the recording unit 118. For example, positioning of the cap 172 may be performed using a positioning member which is separately provided. As a matter of course, positioning of the cap 172 is not necessary when the cap 172 is not provided.

In the above described embodiment, the liquid ejecting head 170 which is included in the recording unit 118 has a configuration in which a plurality of (six, here) individual heads of which both ends in the longitudinal direction thereof (width direction X) are set so as to have an external shape which is an approximate parallelogram with an oblique side which is inclined in a direction orthogonal to the longitudinal direction are provided side by side along the longitudinal direction of the recording unit 118, however, it is not limited to this.

The modification example will be described with reference to schematic diagrams illustrated in FIGS. 24A to 24D.

Figure 24A:
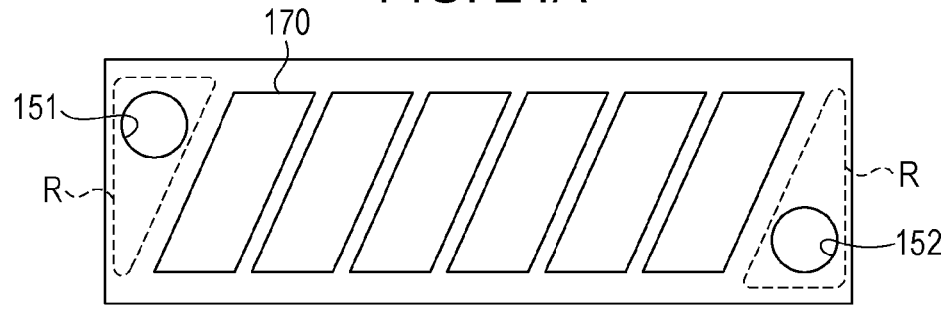
FIG. 24A is an explanatory diagram which schematically illustrates an arrangement of a through hole in the recording unit.
Figure 24B:
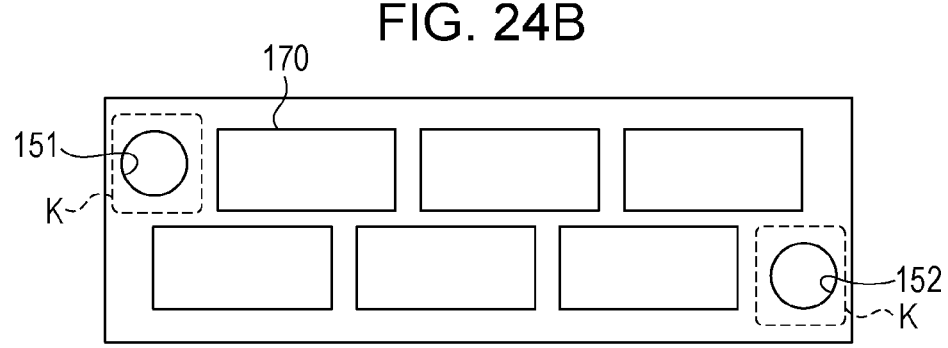
FIG. 24B is an explanatory diagram which schematically illustrates an arrangement of the through hole in the recording unit.

As illustrated in FIG. 24B, the liquid ejecting head 170 included in the recording unit 118 may have a zigzag arrangement in which each liquid ejecting head 170 is arranged in zigzag in contrast with the liquid ejecting head 170, the through hole of one end side 151, and the through hole of the other end side 152 in the above described embodiment illustrated in FIG. 24A. In this case, the through hole of one end side 151 and the through hole of the other end side 152 are respectively formed in rectangular regions K on both sides of the recording unit 118 in the longitudinal direction which are illustrated in FIG. 24B, not the triangular region R.

In this manner, similarly, it is possible to suppress an increase in size of the printer 111 by saving a space for arranging a mechanism for performing an inclination correction of the recording unit 118.

Figure 24C:
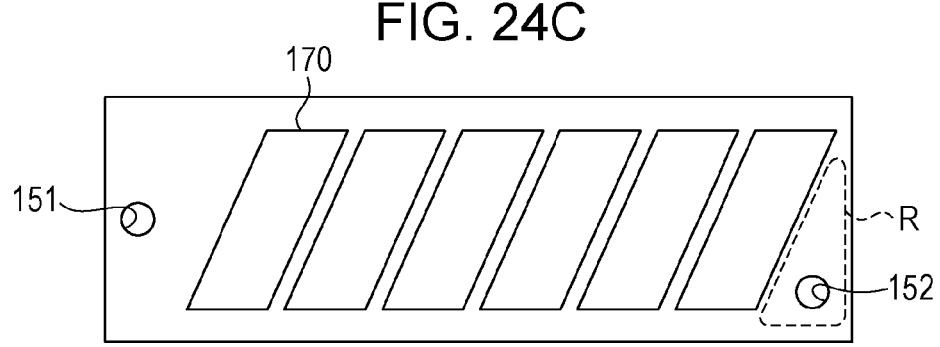
FIG. 24C is an explanatory diagram which schematically illustrates an arrangement of the through hole in the recording unit.
Figure 24D:
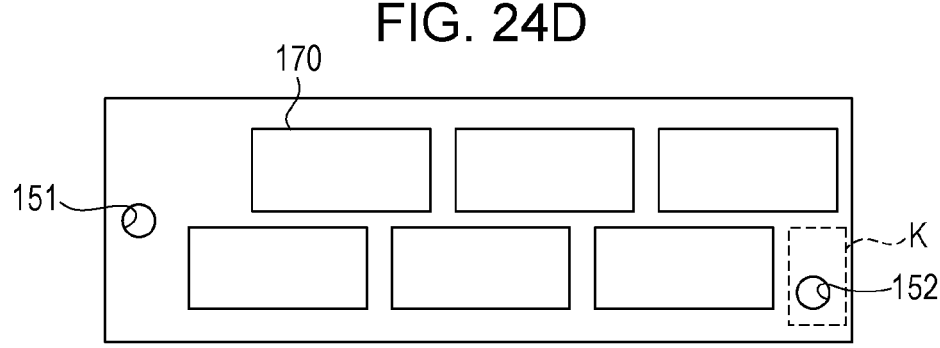
FIG. 24D is an explanatory diagram which schematically illustrates an arrangement of the through hole in the recording unit.
Figure 25:
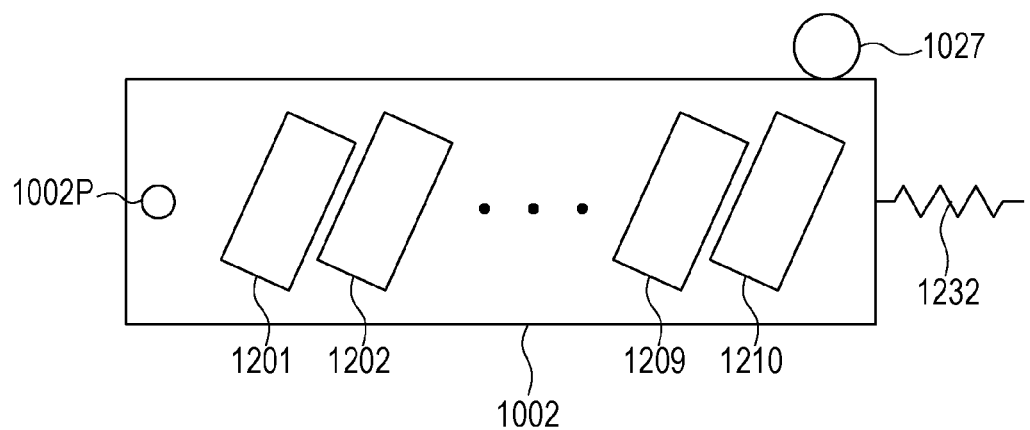
FIG. 25 is an explanatory diagram which schematically illustrates an arrangement of an inclination correction mechanism in a recording unit in the related art.

In addition, as illustrated in FIGS. 24C and 24D, only the through hole of the other end side 152 may be formed in the triangular region R or the rectangular region K. In addition, it is needless to say that only the through hole of one end side 151 may be formed in the triangular region R or the rectangular region K. In this manner, similarly, it is possible to obtain the effect of suppressing the increase in size of the printer 111.

In the above described embodiment, the portion of the base stand unit 199 to which the insertion shaft of one end side 191 as the fixed shaft of one end side, and the fixed shaft of the other end side 193 are respectively fixed, and a portion of the base stand unit 199 in which the bearing unit 199J of the driving roller 134*a* is provided may not necessarily be integrated. For example, when it is a structure in which the insertion shaft of one end side 191 and the fixed shaft of the other end side 193 are fixed in a state in which positional deviations with respect to the sheet 114 which is transported using the driving roller 134*a*, the portion of the base stand unit 199 to which the insertion shaft of one end side 191 and the fixed shaft of the other end side 193 are fixed, and the portion of the base stand unit 199 in which the bearing unit 199J of the driving roller 134*a* is provided may be separate bodies.

In the above described embodiment, a configuration in which the through hole of one end side 151 into which the insertion shaft of one end side 191 is inserted is set only to the first through hole 151A, and the second through hole 151B is not provided may be adopted. For example, it may be a configuration in which the recording unit 118 is stably moved along the movement direction A by making a length of the first through hole 151A in the movement direction A of the recording unit 118 long. Alternatively, for example, it may be a configuration in which a support member which supports the recording unit 118 so as to be interposed between both sides in the transport direction Y is separately provided, and the recording unit 118 can be smoothly moved along the movement direction A.

In the above described embodiment, the insertion shaft of one end side 191 and the insertion shaft of the other end side 192 may not necessarily be guiding shafts which guide a movement of the recording unit 118 when the moving unit 160 moves the recording unit 118 along the movement direction A. That is, a guiding shaft which guides a movement of the recording unit 118 may be provided separately from the insertion shaft of one end side 191 and the insertion shaft of the other end side 192.

In the above described embodiment, in the eccentric cylindrical member 194, the cut face 194C which is parallel to the center shaft line of the cylindrical face 194S may not necessarily be provided at at least a part of the cylindrical face 194S. For example, when the cylindrical face 194S is a face in which it is possible to rotate the eccentric cylindrical member 194 by gripping and turning the cylindrical face using a tool, the cut face is not necessary. For example, it may be a configuration in which a portion of the cylindrical face which is gripped using a tool is set to be nonslip by making a coefficient of friction between the cylindrical face and a tool large, by forming an irregular face at at least a part of the cylindrical face 194S.

In the above described embodiment, the fixing screw 196 as a fixing member of the eccentric cylindrical member 194 may not necessarily be attached to a position opposite to a position of the center shaft line of the fixed shaft of the other end side 193 with respect to the shaft line of the center shaft C1 of the cylindrical face 194S, in the eccentric cylindrical member 194. The fixing screw 196 may be attached to any position when it is a position at which a rotation of the eccentric cylindrical member 194 with respect to the fixed shaft of the other end side 193 is restrained. In addition, the number of fixing screws 196 is not limited to two, it may be one, or may be larger than two.

In the above described embodiment, the second through hole 151B as the through hole of one end side 151 and the through hole of the other end side 152 may not necessarily be a pair of parallel edge portions, and both ends thereof may not necessarily be long circular shaped elongated holes of semicircle edge portions. For example, the holes may be rectangular elongated holes with a longitudinal direction along the longitudinal direction of the recording unit 118. In brief, the holes may have a shape in which a portion with a width which is approximately the same as a dimension of an outer diameter (diameter) of an insertion shaft which is inserted into a through hole has a predetermined length in which the shaft is not scooped out when adjusting an inclination, adjusting a parallel state, or the like, in the longitudinal direction of the recording unit 118, in the transverse direction which intersects (orthogonal) the longitudinal direction of the recording unit 118.

In the above described embodiment, the through hole of one end side 151 is not necessarily arranged so as to overlap with the liquid ejecting head 170 (individual head) which is closest to one end portion side in the longitudinal direction of the recording unit 118 among the liquid ejecting heads 170 in the transport direction Y of the recording unit 118. For example, since the through hole of one end side 151 is a center shaft (reference shaft) of a rotation of the recording unit 118 when performing an inclination correction of the recording unit 118, space saving may be performed by making the shaft thin.

In the above described embodiment, a supply source of ink which is recording liquid ejected from the recording unit 118 may be an ink accommodating body which is provided inside the housing 112 of the printer 111, for example. Alternatively, the supply source may be a so-called external-type ink accommodating body which is provided outside the housing 112. In particular, since it is possible to increase ink capacity in a case of the external-type ink accommodating body, it is possible to perform eject much more ink from the recording unit 118.

In addition, in a case in which ink is supplied to the recording unit 118 from an ink accommodating body which is provided outside the housing 112, it is necessary to pull around an ink supply tube for supplying ink from the outside of the housing 112. Accordingly, in this case, it is preferable to provide a hole, a notch, or the like, for inserting the ink supply tube in the housing 112. Alternatively, the ink supply tube may be pulled into the housing 112 from the outside through a gap by providing the gap in the housing 112. By doing so, it is possible to easily supply ink to the recording unit 118 using an ink path of the ink supply tube.

In the above described embodiment, the recording apparatus 11, 11*a*, and the printer 111 may be liquid ejecting apparatuses which perform recording by ejecting or discharging fluid other than ink (including liquid, liquid body in which particles of functional material are dispersed or mixed, fluid body such as gel, and solid body which can be ejected as fluid body by being flown). For example, it may be a liquid ejecting apparatus which perform printing by ejecting a liquid body including a material such as an electrode material, or a coloring material (pixel material) which is used when manufacturing, for example, a liquid crystal display, an EL (electroluminescence) display, and a surface emission display in a form of dispersion, or dissolution. In addition, it may be a liquid ejecting apparatus which ejects a liquid body such as gel (for example, physical gel), or a powdery granule ejecting apparatus (for example, toner jet-type printing apparatus) which ejects a solid body which is an example of powder (powdery granule) such as toner. In addition, it is possible to apply the invention to any one of these fluid ejecting apparatuses. In the specification, "fluid" does not include fluid which is formed only of gas, and in the fluid, for example, liquid (including inorganic solvent, organic solvent, liquid, liquid resin, liquid metal (metallic melt), or the like), a liquid body, a fluid body, a granular material (including granule and powder), and the like, are included.

The entire disclosure of Japanese Patent Application No. 2014-238088, filed Nov. 25, 2014 and 2014-248117, filed Dec. 8, 2014 and 2015-164506, filed Aug. 24, 2015 are expressly incorporated by reference herein.

What is claimed is:

1. A recording apparatus comprising:
a recording unit which performs recording on a medium which is transported along a transport path;
an accommodating unit which accommodates the recording unit;
a discharging unit which discharges the medium on which recording is performed by the recording unit; and
a support unit which is located at a higher part of the recording unit, receives and supports the medium which is discharged by the discharging unit, and is openable or closable with respect to the accommodating unit,
wherein an access path through which it is possible to access the recording unit from the higher part by causing the support unit to be opened is formed,
wherein, in the recording unit, a through hole of one end side which penetrates one end portion in a longitudinal direction, in a direction which goes along a normal line, and a through hole of the other end side which penetrates the other end portion in the longitudinal direction, in a direction which goes along the normal line are provided by setting a direction which intersects both a transport direction of the medium in the transport path and a direction which goes along the normal line of a recording face of the medium to the longitudinal direction,
wherein, in the accommodating unit, a base stand unit in which an insertion shaft of one end side which has a shaft line in a direction which goes along the normal line, and is inserted into the through hole of one end side, and an insertion shaft of the other end side which has a shaft line in a direction which goes along the normal line, and is inserted into the through hole of the other end side are provided,
wherein the through hole of one end side is a circular hole, and the insertion shaft of one end side is a fixed shaft of one end side which is fixed to the base stand unit, and
wherein the through hole of the other end side is an elongated hole which has a parallel edge portion which goes along the longitudinal direction of the recording unit, and the insertion shaft of the other end side is a fixed shaft of the other end side which is fixed to the base stand unit.

2. The recording apparatus according to claim 1, wherein a portion of the support unit which overlaps with the recording unit when viewed from above can be opened until the portion which overlaps with the recording unit becomes smaller than that in a closed state.

3. The recording apparatus according to claim 1, wherein the support unit is detachably configured with respect to the accommodating unit.

4. The recording apparatus according to claim 1, wherein the insertion shaft of the other end side includes an eccentric cylindrical member which has a cylindrical face in which a shaft line which is eccentric from a center shaft line of the fixed shaft of the other end side is set to a center shaft on an outer face, and the cylindrical face can rotate around the fixed shaft of the other end side.

5. The recording apparatus according to claim 4,
wherein the recording unit is configured by including a plurality of liquid ejecting heads which are provided side by side in the longitudinal direction, and
wherein the through hole of the other end side is arranged so as to overlap with a liquid ejecting head which is located at the end of the other end portion side in the plurality of liquid ejecting heads, in the transport direction of the medium of the recording unit.

6. The recording apparatus according to claim 5, wherein the through hole of one end side is arranged so as to overlap with a liquid ejecting head which is located at the end of the one end portion side in the plurality of liquid ejecting heads, in the transport direction of the medium of the recording unit.

7. The recording apparatus according to claim 6, further comprising:
a moving unit which relatively moves the recording unit with respect to the recording face of the medium,
wherein the insertion shaft of one end side and the insertion shaft of the other end side are guiding shafts which guide a movement of the recording unit when the moving unit moves the recording unit.

8. The recording apparatus according to claim 7,
wherein, when the through hole of one end side into which the insertion shaft of one end side is inserted is set to a first through hole, the recording unit includes a second through hole which is provided at a position far from the recording face of the medium compared to the first through hole in a movement direction in which the recording unit is moved by the moving unit, and into which the insertion shaft of one end side is inserted, and
wherein the second through hole is an elongated hole which has a parallel edge portion which goes along the longitudinal direction of the recording unit.

9. A recording apparatus comprising:
a recording unit which performs recording on a medium which is transported along a transport path;
an accommodating unit which accommodates the recording unit;
a discharging unit which discharges the medium on which recording is performed by the recording unit;
a support unit which is located at a higher part of the recording unit, receives and supports the medium which is discharged by the discharging unit, and is openable or closable with respect to the accommodating unit; and
a path forming member which is arranged between the support unit and the recording unit, and forms a reversing path on which the medium is reversed,
wherein an access path through which it is possible to access the recording unit from the higher part by causing the path forming member to be opened in a state in which the support unit is opened is formed,
wherein, in the recording unit, a through hole of one end side which penetrates one end portion in a longitudinal direction, in a direction which goes along a normal line, and a through hole of the other end side which penetrates the other end portion in the longitudinal direction, in a direction which goes along the normal line are provided by setting a direction which intersects both a transport direction of the medium in the transport path and a direction which goes along the normal line of a recording face of the medium to the longitudinal direction, wherein, in the accommodating unit, a base stand unit in which an insertion shaft of one end side which has a shaft line in a direction which goes along the normal line, and is inserted into the through hole of one end side, and an insertion shaft of the other end side which has a shaft line in a direction which goes along the normal line, and is inserted into the through hole of the other end side are provided, wherein the through hole of one end side is a circular hole, and the insertion shaft of one end side is a fixed shaft of one end side which is fixed to the base stand unit, and wherein the through hole of the other end side is an elongated hole which has a parallel edge portion which goes along the longitudinal direction of the recording unit, and the insertion shaft of the other end side is a fixed shaft of the other end side which is fixed to the base stand unit.

10. The recording apparatus according to claim 9, wherein the path forming member is inclined so as to be high along a discharging direction in which the medium is discharged, and wherein an opening-closing fulcrum when the path forming member is opened or closed is located on the upstream side in the discharging direction.

11. The recording apparatus according to claim 9, wherein the path forming member is detachably configured with respect to the accommodating unit.

12. The recording apparatus according to claim 9, wherein the support unit is inclined so as to be high along the discharging direction in which the medium is discharged, and wherein an opening-closing fulcrum when the support unit is opened or closed is located on the upstream side in the discharging direction.

13. A recording apparatus comprising:

a recording unit which performs recording on a medium which is transported along a transport path;

an accommodating unit which accommodates the recording unit;

wherein, in the recording unit, a through hole of one end side which penetrates one end portion in a longitudinal direction, in a direction which goes along a normal line, and a through hole of the other end side which penetrates the other end portion in the longitudinal direction, in a direction which goes along the normal line are provided by setting a direction which intersects both a transport direction of the medium in the transport path and a direction which goes along the normal line of a recording face of the medium to the longitudinal direction, wherein, in the accommodating unit, a base stand unit in which an insertion shaft of one end side which has a shaft line in a direction which goes along the normal line, and is inserted into the through hole of one end side, and an insertion shaft of the other end side which has a shaft line in a direction which goes along the normal line, and is inserted into the through hole of the other end side are provided, wherein the through hole of one end side is a circular hole, and the insertion shaft of one end side is a fixed shaft of one end side which is fixed to the base stand unit, and wherein the through hole of the other end side is an elongated hole which has a parallel edge portion which goes along the longitudinal direction of the recording unit, and the insertion shaft of the other end side is a fixed shaft of the other end side which is fixed to the base stand unit.

* * * * *